(12) United States Patent
Rumberger et al.

(10) Patent No.: US 8,647,567 B2
(45) Date of Patent: Feb. 11, 2014

(54) METHODS OF PROVIDING UNIFORM DELIVERY OF A FUNCTIONAL AGENT FROM A SHAPED COMPOSITION

(75) Inventors: Evan Rumberger, Pleasanton, CA (US); William Ouellette, Pleasanton, CA (US); William L. Smith, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 8 days.

(21) Appl. No.: 13/427,731

(22) Filed: Mar. 22, 2012

(65) Prior Publication Data

US 2013/0075346 A1 Mar. 28, 2013

Related U.S. Application Data

(60) Provisional application No. 61/472,442, filed on Apr. 6, 2011, provisional application No. 61/472,423, filed on Apr. 6, 2011.

(51) Int. Cl.
*A61L 2/00* (2006.01)

(52) U.S. Cl.
USPC ............................. 422/28; 134/22.16; 221/93

(58) Field of Classification Search
USPC ............. 422/28; 134/22.16, 22.17, 22.19, 26; 221/93, 175, 206; 222/129
See application file for complete search history.

(56) References Cited

U.S. PATENT DOCUMENTS

| | | | |
|---|---|---|---|
| 3,562,165 A | 2/1971 | Altieri |
| 3,607,759 A | 9/1971 | Barth |
| 3,856,932 A | 12/1974 | May |
| 3,978,235 A | 8/1976 | Schiro |
| 3,998,751 A | 12/1976 | Murray |
| 4,145,306 A | 3/1979 | Tatara |
| 4,192,763 A | 3/1980 | Buchan |
| 4,200,606 A | 4/1980 | Kitko |
| 4,265,847 A | 5/1981 | Hunt |
| 4,334,610 A | 6/1982 | Ota |
| 4,374,563 A | 2/1983 | Alexander |
| 4,536,389 A | 8/1985 | White |
| 4,601,823 A | 7/1986 | Beck |
| 4,605,498 A | 8/1986 | Kulish |

(Continued)

FOREIGN PATENT DOCUMENTS

| | | |
|---|---|---|
| CN | 201354325 | 12/2009 |
| CN | 201525770 | 7/2010 |

(Continued)

OTHER PUBLICATIONS

International PCT Search Report; PCT/US2012/31476;The Clorox Company; Jun. 27, 2012.

*Primary Examiner* — Monzer R Chorbaji
(74) *Attorney, Agent, or Firm* — Alok Goel

(57) ABSTRACT

Methods for introducing a substantially uniform concentration of a functional agent into a flowing stream of water using a shaped composition. The composition may be shaped and sized to be inserted into a device configured to be attached over the end of a faucet. The shaped composition comprises a dissolvable region including a functional agent (e.g., an antimicrobial sanitizing agent). A non-dissolvable region disposed adjacent to the dissolvable region may optionally be provided. The substantially non-dissolvable region remains substantially intact as the dissolving region is progressively dissolved, introducing the functional agent into a flowing stream of water.

20 Claims, 18 Drawing Sheets

(56) References Cited

U.S. PATENT DOCUMENTS

| | | |
|---|---|---|
| 4,606,775 A | 8/1986 | Robinson |
| 4,683,072 A | 7/1987 | Holdt |
| 4,692,335 A | 9/1987 | Iwanski |
| 4,822,512 A | 4/1989 | Auchincloss |
| 4,865,760 A | 9/1989 | Johnson |
| 4,923,426 A | 5/1990 | Klundt |
| 4,961,872 A | 10/1990 | Sinclair |
| 5,004,549 A | 4/1991 | Wood |
| 5,009,806 A | 4/1991 | Johnson |
| 5,049,385 A | 9/1991 | Wiedrich |
| 5,106,559 A | 4/1992 | Wiedrich et al. |
| 5,112,521 A | 5/1992 | Mullins |
| 5,114,647 A | 5/1992 | Levesque |
| 5,178,787 A | 1/1993 | Hung |
| 5,205,961 A | 4/1993 | Shenefiel |
| 5,318,328 A | 6/1994 | Dawson |
| 5,320,751 A | 6/1994 | Burns |
| 5,395,546 A | 3/1995 | Hung |
| 5,407,598 A | 4/1995 | Olson |
| 5,478,482 A | 12/1995 | Jones |
| 5,514,287 A | 5/1996 | Jones |
| 5,536,401 A | 7/1996 | Burns |
| 5,565,576 A | 10/1996 | Hall |
| 5,575,945 A | 11/1996 | Perlman |
| 5,578,559 A | 11/1996 | Dolan |
| 5,603,941 A | 2/1997 | Farina |
| 5,637,230 A | 6/1997 | Billings |
| 5,670,059 A | 9/1997 | Jones |
| 5,741,520 A | 4/1998 | DeSenna |
| 5,750,061 A | 5/1998 | Farina |
| 5,753,602 A | 5/1998 | Hung |
| 5,755,330 A | 5/1998 | Siragusa |
| 5,763,376 A | 6/1998 | Ward |
| 5,817,337 A | 10/1998 | DeSenna |
| 5,885,949 A | 3/1999 | Stamm |
| 5,895,781 A | 4/1999 | Neumiller |
| 5,910,475 A | 6/1999 | Neumiller |
| 6,007,735 A * | 12/1999 | Creed ..................... 252/186.25 |
| 6,019,905 A | 2/2000 | Waggoner |
| 6,057,281 A | 5/2000 | Stamm |
| 6,099,861 A | 8/2000 | DeSenna |
| 6,121,215 A | 9/2000 | Rau |
| 6,124,251 A | 9/2000 | Rader |
| 6,136,768 A | 10/2000 | Dawson |
| 6,153,120 A | 11/2000 | Scialla |
| 6,164,332 A | 12/2000 | Hatton |
| 6,165,505 A | 12/2000 | DeSenna |
| 6,227,463 B1 | 5/2001 | Porter |
| 6,235,127 B1 | 5/2001 | Rader |
| 6,355,607 B1 | 3/2002 | Rahman |
| 6,399,564 B1 | 6/2002 | Speed |
| 6,440,915 B2 | 8/2002 | Rader |
| 6,447,722 B1 | 9/2002 | Rakestraw |
| 6,451,746 B1 | 9/2002 | Moore |
| 6,544,487 B1 | 4/2003 | Ferguson |
| 6,589,924 B2 | 7/2003 | Schmidt |
| 6,593,417 B1 | 7/2003 | Anderson |
| 6,713,441 B1 | 3/2004 | DeSenna |
| 6,825,159 B2 | 11/2004 | Man |
| 6,827,792 B2 | 12/2004 | Cervero |
| 6,852,238 B2 | 2/2005 | Connelly, Jr. |
| 6,863,830 B1 | 3/2005 | Purdy |
| 6,969,527 B2 | 11/2005 | Brennan |
| 6,984,398 B2 | 1/2006 | Brennan |
| 6,995,129 B2 | 2/2006 | Olson |
| 7,014,782 B2 | 3/2006 | D'Emidio |
| 7,018,562 B2 | 3/2006 | Morioka |
| 7,074,363 B2 | 7/2006 | Edmondson |
| 7,252,112 B1 | 8/2007 | Imler |
| 7,285,522 B2 | 10/2007 | van Buskirk |
| 7,309,444 B2 | 12/2007 | Connelly, Jr. |
| 7,410,938 B2 | 8/2008 | Brennan |
| 7,431,863 B2 | 10/2008 | Pickens |
| 7,465,412 B2 | 12/2008 | Pickens |
| 7,517,847 B2 | 4/2009 | Catalfamo |
| 7,534,368 B2 | 5/2009 | Martin |
| 7,625,496 B2 | 12/2009 | Rawat |
| 7,753,079 B2 | 7/2010 | Nelson |
| 7,780,857 B2 | 8/2010 | Rawat |
| 7,927,510 B2 | 4/2011 | Mullins |
| 2002/0004471 A1 | 1/2002 | Rader |
| 2002/0028758 A1 | 3/2002 | Duncan |
| 2002/0058605 A1 | 5/2002 | Schmidt |
| 2002/0061831 A1 | 5/2002 | Kaziska |
| 2003/0021819 A1 | 1/2003 | Khanna |
| 2003/0104965 A1 | 6/2003 | Czuczak |
| 2004/0043914 A1 | 3/2004 | Kaziska |
| 2004/0157760 A1 | 8/2004 | Man |
| 2004/0164029 A1 | 8/2004 | Souter |
| 2004/0197395 A1 | 10/2004 | Brennan |
| 2004/0214738 A1 | 10/2004 | Brennan |
| 2004/0217326 A1 | 11/2004 | Souter |
| 2005/0113279 A1 | 5/2005 | Desmarescaux |
| 2006/0040846 A1 | 2/2006 | Hoyt |
| 2006/0093669 A1 | 5/2006 | Brennan |
| 2006/0110453 A1 | 5/2006 | Brennan |
| 2007/0125979 A1 | 6/2007 | Lei |
| 2008/0004202 A1 | 1/2008 | Wolfgang |
| 2008/0008621 A1* | 1/2008 | Ikeda et al. ..................... 422/37 |
| 2008/0020096 A1 | 1/2008 | Blum et al. |
| 2008/0067468 A1 | 3/2008 | Pickens |
| 2008/0073681 A1 | 3/2008 | Kanaya |
| 2008/0083071 A1 | 4/2008 | Tremblay |
| 2008/0107701 A1 | 5/2008 | Rawat |
| 2008/0135062 A1 | 6/2008 | Hibbard |
| 2008/0166365 A1 | 7/2008 | Ravetti |
| 2008/0248989 A1 | 10/2008 | Holderbaum |
| 2008/0258104 A1 | 10/2008 | Mullins |
| 2008/0299161 A1 | 12/2008 | Sanderson |
| 2009/0028965 A1 | 1/2009 | Healey |
| 2009/0054289 A1 | 2/2009 | Dietsche |
| 2009/0090661 A1 | 4/2009 | Tanner |
| 2009/0197787 A1 | 8/2009 | Venet |
| 2009/0208547 A1 | 8/2009 | Martin |
| 2009/0232903 A1 | 9/2009 | Sanderson |
| 2010/0055203 A1 | 3/2010 | Rawat |
| 2010/0140544 A1 | 6/2010 | Smith |
| 2010/0183693 A1 | 7/2010 | Martin |
| 2010/0249007 A1 | 9/2010 | Holderbaum |
| 2010/0264361 A1 | 10/2010 | Rawat |
| 2010/0297320 A1 | 11/2010 | Branlard |
| 2010/0323083 A1 | 12/2010 | Rubinstenn |
| 2011/0027194 A1 | 2/2011 | Smith |
| 2011/0028368 A1 | 2/2011 | Smith |
| 2011/0044914 A1 | 2/2011 | Kohli |
| 2011/0052724 A1 | 3/2011 | Pickens |
| 2011/0052726 A1 | 3/2011 | Smith |
| 2011/0059882 A1 | 3/2011 | Smith |
| 2011/0094972 A1 | 4/2011 | King |
| 2011/0142978 A1 | 6/2011 | Linossier |
| 2011/0233145 A1 | 9/2011 | Mullins |

FOREIGN PATENT DOCUMENTS

| | | |
|---|---|---|
| EP | 0824146 | 2/1998 |
| EP | 1600285 | 11/2005 |
| EP | 1953119 | 6/2008 |
| FR | 2870777 | 5/2004 |
| FR | 2865214 | 7/2005 |
| FR | 2872447 | 1/2006 |
| FR | 2883478 | 9/2006 |
| FR | 2926088 | 7/2009 |
| FR | 2939607 | 6/2010 |
| JP | 01254290 | 10/1989 |
| WO | WO91 03936 | 4/1991 |
| WO | WO99 92632 | 6/1999 |
| WO | WO99 61376 | 12/1999 |
| WO | WO01 09231 | 2/2001 |
| WO | WO01 09260 | 2/2001 |
| WO | WO01 49818 | 7/2001 |
| WO | WO2006 050477 | 5/2006 |
| WO | WO2006 097612 | 9/2006 |
| WO | WO2007 064681 | 6/2007 |
| WO | WO2007 065228 | 6/2007 |

(56) References Cited

FOREIGN PATENT DOCUMENTS

| WO | WO2008 009804 | 1/2008 |
| WO | WO2008 073681 | 6/2008 |
| WO | WO2008 110172 | 9/2008 |
| WO | WO2008 130472 | 10/2008 |
| WO | WO2009 106476 | 9/2009 |
| WO | WO2011062811 | * 5/2011 ............. C11D 3/395 |

* cited by examiner

Fig. 6

Diagram To Define Aspect Ratio.
Aspect Ratio = 2r / h

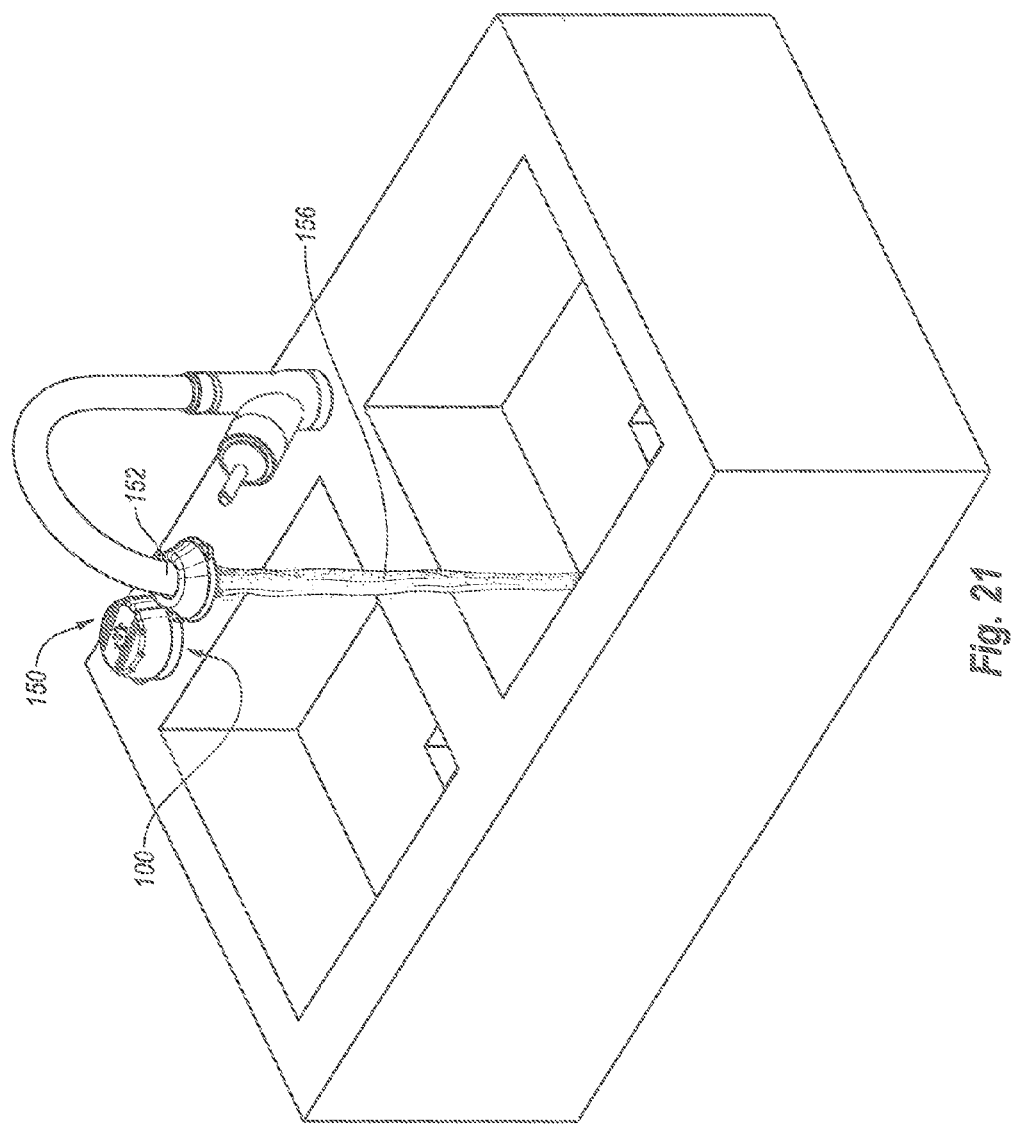

METHODS OF PROVIDING UNIFORM DELIVERY OF A FUNCTIONAL AGENT FROM A SHAPED COMPOSITION

CROSS REFERENCE TO RELATED APPLICATIONS

This application claims the benefit of U.S. Provisional Patent Application No. 61/472,442, filed Apr. 6, 2011 entitled SHAPED COMPOSITIONS FOR UNIFORM DELIVERY OF A FUNCTIONAL AGENT and U.S. Provisional Patent Application No. 61/472,423, also filed Apr. 6, 2011 entitled FAUCET MOUNTABLE WATER CONDITIONING DEVICE, the disclosures of each of which are incorporated herein in their entirety.

BACKGROUND OF THE INVENTION

1. The Field of the Invention

The present invention relates to methods of delivering a functional agent into a stream of water at a substantially uniform, desired concentration.

2. Background and Relevant Art

In many areas of the world, particularly rapidly developing countries, the safety of the food supply is often questionable. For example, fruits, vegetables, meats, and other foods may sometimes include bacterial or other microbial carriers of infection. Such issues of microbial contamination are particularly an issue in developing countries such as China and those of Latin America. Even within relatively well developed countries, such as the United States and many European countries, there are occasional incidents of produce or other food products found to be contaminated with E. coli or other microbes.

Consumers are often instructed to wash produce and other food products before consumption, although many consumers sometimes forget to do so, or even if such washing is performed, residual microbes or other contaminants may remain on the product. As a result, food borne illness may still occur. As such, there is a continuing need for improved methods and systems for sanitizing food products.

BRIEF SUMMARY OF THE INVENTION

In accordance with the above objects and those that will be mentioned and will become apparent below, one aspect of the invention is a method for introducing a substantially uniform concentration of an antimicrobial sanitizing functional agent into a flowing stream of water, the method comprising: providing a shaped composition comprising a cylindrically shaped dissolvable region including an antimicrobial sanitizing functional agent, the dissolvable region having an exterior surface area including a top surface, a bottom surface, and a peripheral surface; the functional agent being selected from the group consisting of a hypochlorite, a peroxide, a quaternary ammonium compound, a silver salt, an N-halogen compound, an antimicrobial organic acid, and combinations thereof; and contacting a flowing stream of water with the top surface of the cylindrically shaped dissolvable region to introduce the functional agent into the flowing stream of water, contact between the flowing stream of water and the top surface of the cylindrically shaped dissolvable region introducing the antimicrobial sanitizing functional agent into the flowing stream of water at a substantially constant concentration over a life of the shaped composition.

In accordance with the above objects and those that will be mentioned and will become apparent below, one aspect of the invention is a method for introducing a substantially uniform concentration of an antimicrobial sanitizing hypochlorite functional agent into a flowing stream of water, the method comprising: providing a shaped composition a cylindrical dissolvable region including a hypochlorite salt selected from the group consisting of calcium hypochlorite, magnesium hypochlorite and mixtures thereof, the cylindrical dissolvable region having an exterior surface area including a top surface, a bottom surface, and a peripheral surface; and contacting a flowing stream of water with the top surface of the dissolvable region to introduced into the flowing stream of water being maintained at a substantially constant concentration between about 25 ppm and about 200 ppm over the life of the shaped composition.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings, depict only typical embodiments of the invention and are therefore not to be considered limiting of its scope. The invention will be described and explained with additional specificity and detail through the use of the accompanying drawings in which:

FIG. 6 is a table showing compositional characteristics of example compositions that were made;

FIG. 10 is a graph showing the dissolution characteristics of composition example 30a;

FIG. 12 is a graph showing the dissolution characteristics of composition example 31a;

FIG. 21 is a perspective view of the faucet mountable housing shown in FIG. 19 attached to a kitchen faucet over a sink with the shaped composition positioned out of the path of the flowing stream of water.

DETAILED DESCRIPTION OF THE PREFERRED EMBODIMENTS

Introduction

Figure 1:
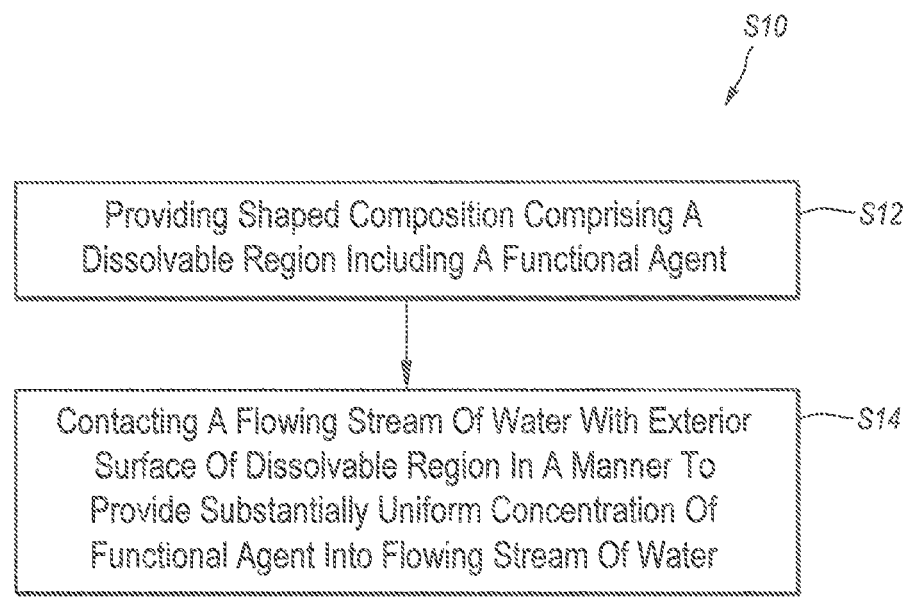
FIG. 1 is a flow chart describing a method of providing uniform delivery of a functional agent into a flowing stream of water using a shaped composition.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more such surfactants.

Unless defined otherwise, all technical and scientific terms used herein have the same meaning as commonly understood by one of ordinary skill in the art to which the invention pertains. Although a number of methods and materials similar or equivalent to those-described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentage ("wt %'s") are in wt % (based on 100 weight % active) of the particular material present in the referenced composition, any remaining percentage being water or an aqueous carrier sufficient to account for 100% of the composition, unless otherwise noted.

General

The present invention is directed to methods for introducing a functional agent into a flowing stream of water at a substantially uniform concentration through use of shaped composition. The shaped composition includes a dissolvable region including the functional agent. A flowing stream of water (e.g., as provided from a faucet) is contacted with a portion of the exterior surface of the dissolvable region of the shaped composition to introduce the functional agent into the stream of water. In order to ensure that the delivered concentration remains substantially constant over the life of the shaped composition, the portion of the exterior surface of the shaped composition along which the flowing water contacts remains substantially constant over the life of the shaped composition. Maintaining this exterior surface area along which dissolution of the functional agent occurs to a substantially constant value ensures that the concentration of functional agent delivered into the flowing stream of water also remains substantially constant over the life of the shaped composition.

In one embodiment, the composition is shaped and sized to be inserted into a device configured to be attached over the end of a faucet (e.g., a sink or shower faucet). In one embodiment, the shaped composition may include a substantially non-dissolvable backing region or layer in addition to the dissolvable layer to further improve the uniformity of the delivered concentration of functional agent over the life of the shaped composition. In one embodiment, the functional agent may be an anti-microbial sanitizing agent that can be used to provide a food-safe anti-microbial sanitizing wash for foods (e.g., lettuce, strawberries, etc.), hands, hard surfaces, soft surfaces, etc. Additionally, an anti-microbial sanitizing agent can allow for rinsing of sponges, cutting boards, utensils, child cups or anything else a user may be concerned has hidden germs.

The dissolvable region is shaped so as to include a top surface, a bottom surface, and a peripheral surface. During use, a flow of water is contacted with a surface (e.g., the top surface) of the dissolvable region so that the functional agent within the dissolvable region is dissolved into the water, which functionalized water then exits the device attached over the dispensing end of the faucet. The device including the shaped composition may be used to deliver a flow of anti-microbial sanitizing water, or a flow of water including other functional agents included therein.

In one embodiment, the flow of water may be intermittently applied during use. The shaped composition may include features to minimize continued dissolution of the composition when the flow of water has stopped. For example, the shaped composition may be configured to facilitate drainage of water away from the composition so as to provide more uniform dispensing of functional agent even under intermittent use conditions. In one embodiment the composition is shaped so that gravity pulls the water away from the composition. For example, the top of the tablet or other shaped composition may have a high point near its center so that water flows to the edges. The bottom of the shaped composition may have a low point near its center towards which the water will flow and accumulate to form drops that fall away from the composition.

In one embodiment, one or more protrusions (e.g. pins) may protrude from the bottom of the shaped composition.

Water will thus tend to flow to the tips of such protrusions, away from the surface of the composition. The protrusions may comprise a material that is more hydrophilic than the surface of the tablet. Preferably, the protrusions may be substantially non-dissolvable. In one embodiment, such protrusions may comprise the same material as the substantially non-dissolving layer. Such protrusions may be part of (e.g., comprise a single integral piece with) or otherwise be attached to the substantially non-dissolving layer, or they may be a separate component of the composition. To further facilitate drainage of water, the surface of the composition, any protrusions, or both may have grooves formed therein.

Exemplary functional agents may provide a soap for washing dishes, hands, hard surfaces, soft surfaces, other surfaces, a disinfecting kitchen or bathroom cleaner, a disinfecting shower cleaner, an anti-microbial sanitizing rinse for a bathroom faucet (e.g., sufficiently gentle to be used on toothbrushes, retainers, hands, etc.), flavored water beverage that may include antioxidants. Functional agents can also or alternatively include vitamins for conferring a health benefit to the consumer, minerals for conferring a health benefit to the consumer, remove chemicals and pesticides from food, dilution for other cleaners, a light kitchen cleaner, a dish soap sufficiently mild for hands, a facial wash, softened tap water. In addition, functional agents can include a strong shower cleaner, tap water free of chlorine and odor, a concentrated disinfecting cleaner, a drain cleaner, a moisturizing body wash from a shower faucet, an aromatherapy wash from a shower faucet, or a gentle skin sanitizer from a shower faucet. Additional exemplary functional agents will be apparent to one of skill in the art in light of the present disclosure.

Various contemplated methods of use include methods of sanitizing, methods of sanitizing using a faucet mount device that rotates or flips from an active position (i.e., where functional agent is introduced into the stream of water) to an inactive position (i.e., where the stream of water does not contact the shaped composition) and vice versa without dismounting the faucet mount device from the faucet, methods of rinsing an object and putting it aside, etc.). While this invention discloses various methods for delivering a stream of water including a functional agent dissolved, entrained, or otherwise introduced therein, the invention also encompasses a system (i.e. the faucet attachable device with the shaped composition) for conditioning, as well as the shaped composition itself.

As used herein, the term "dissolve" is to be broadly construed to include dissolution, as well as entrainment or other introduction of a functional agent into a flowing stream of water. For example, while some functional agents may be lipophilic (e.g., fragrances) so as to not truly dissolve within the stream of water, they can be entrained or otherwise introduced into the stream of water, and for the sake of simplicity, such materials may be broadly be described as dissolving into the flowing stream of water as that term is used herein.

Exemplary Methods of Introducing a Functional Agent into a Flowing Stream of Water FIG. 1 is a flowchart S10 generally describing the method by which a functional agent is introduced into a flowing stream of water. At S12, a shaped composition comprising a dissolvable region including a functional agent is provided. At S14, a flowing stream of water is contacted with a portion of the exterior surface area (e.g., the top surface) of the dissolvable region to introduce the functional agent into the flowing stream of water. Contact between the dissolvable region and the flowing stream of water is done in a manner so that the portion of the exterior surface area long which the flowing stream of water contacts and dissolves or otherwise introduces the functional agent into the stream of water remains substantially the same over the life of the shaped composition. For example, dissolution of the dissolvable region may be accomplished by contacting the water with the top and/or bottom surface of the shaped composition and minimizing any dissolution that occurs along the peripheral surface of the dissolvable region relative to that occurring at the top and/or bottom surfaces.

In one embodiment, the dissolvable region is shaped as a cylinder with a top surface, a bottom surface, and a peripheral surface. Where dissolution occurs principally at the top (or bottom) surfaces, the surface area attributable of these top and bottom surfaces remains the same throughout the life of the shaped composition, as the dissolvable region is dissolved through the mechanism of height reduction.

Figure 2:
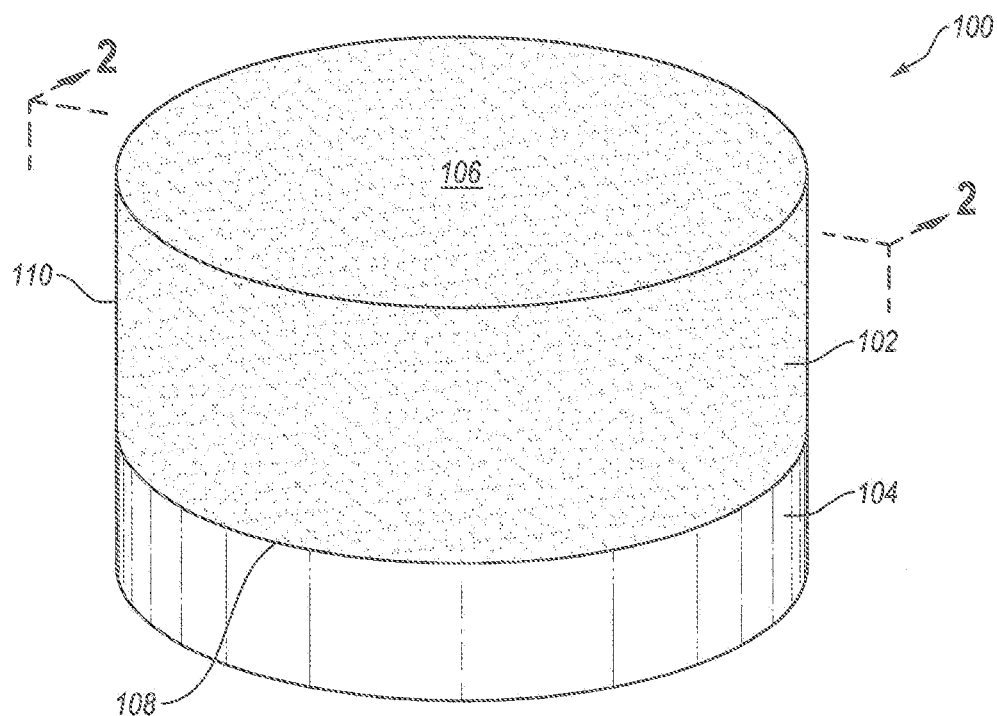
FIG. 2 depicts a perspective view of an exemplary shaped composition.
Figure 3:
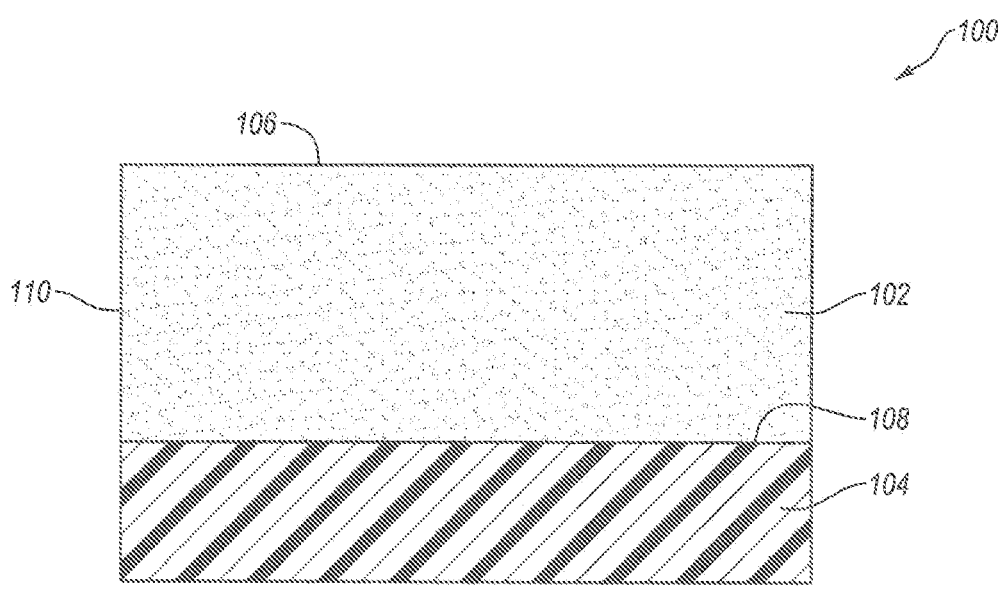
FIG. 3 is a cross-sectional view through the composition of FIG. 2.

Exemplary Shaped Compositions for Substantially Uniform Delivery of a Functional Agent FIGS. 2 and 3 illustrate perspective and cross-sectional views, respectively of an exemplary shaped composition 100 including a dissolvable region 102 and an adjacent substantially non-dissolvable region 104. In a preferred embodiment, the shaped composition 100 may be substantially cylindrical. In one embodiment, the dissolvable portion 102 of the substantially cylindrical composition 100 may have a diameter greater than the height so as to provide a relatively short, squat, puck-like configuration. In one embodiment, the ratio of the diameter to height is at least about 1, at least about 1.5, at least about 2, at least about 3, or at least about 5. In another embodiment, the ratio of the diameter to the height is at least about 0.1, at least about 0.2, at least about 0.3, at least about 0.4, at least about 0.5, at least about 0.6, at least about 0.7, at least about 0.8, at least about 0.9, or at least about 1.

Region 102 includes a top surface 106, a bottom surface 108, and a peripheral surface 110. Non-dissolvable region 104 may include a similar cross-sectional shape as dissolvable region 102 (e.g., it may also be cylindrical). As shown, non-dissolvable region 104 is disposed adjacent to bottom surface 108 of dissolvable region 102. In one embodiment, substantially the entire bottom surface 108 is covered by non-dissolvable region 104. Such configurations aid in providing a substantially uniform concentration of functional agent throughout the life of the dissolvable region 102, as will be explained in further detail hereafter. Non-dissolvable region 104 and dissolvable region 102 may both be substantially cylindrical and have a diameter substantially equal to one another so that an exterior peripheral surface of both the first layer and adjacent second layer are substantially flush with one another, as shown in FIGS. 2-3.

Relatively high aspect ratios of diameter to height of region 102, as well as covering bottom surface 108 of region 102, aids in providing a substantially uniform concentration of functional agent throughout the life of region 102. For example, the rate of dissolution of region 102 is dependent on the surface area along which dissolution is occurring at any given time. Maintaining a substantially uniform rate of dissolution aids in maintaining a substantially uniform concentration of functional agent within the water stream. Because of this dependency, shapes and orientations configured to provide substantially equal surface area along which dissolution occurs during the life of the shaped composition are preferred. For example, a cylindrical configuration in which dissolution occurs as a result of height reduction is one preferred configuration, as the surface area of the top surface, where dissolution principally occurs when the water stream is delivered to this surface, remains the same as the height of the cylinder is progressively reduced.

Other shapes providing this same characteristic could alternatively be used (e.g., a rectangular prism, a modified cylinder having an oval transverse cross-section, etc.). Such shapes providing a substantially constant cross-sectional surface area as the shape is reduced through reduction in the height are preferred because the surface area along which dissolution of the functional agent occurs remains substantially constant throughout the course of use. For example, with a cylindrical shaped composition, because the dissolution of the dissolvable region occurs through the mechanism of height reduction, and because a cylinder has a circular cross-section whose cross-sectional area remains the same through any given location of the cylinder, the rate of dissolution of the dissolvable region (and thus the functional agent) remains substantially constant throughout the life of the shaped composition.

The relative constancy of the dissolution rate (and thus concentration of the functional agent within the delivered stream of water) is further aided by providing a substantially non-dissolvable region 104 disposed adjacent to the dissolvable region 102. For example, by positioning the non-dissolvable region 104 against the bottom surface 108 of region 102, water is not easily able to contact bottom surface 108 so as to dissolve this region until the material disposed above bottom surface 108 is first dissolved. This is beneficial as although theoretically dissolution occurs via height reduction, often the top surface may not remain horizontal or flat, as some portions may tend to dissolve faster than others, which can often result in faster erosion adjacent the peripheral edge. By covering bottom surface 108 so that it does not participate in the dissolution, this effect is limited to only the top surface, effectively cutting this non-uniformity in half as compared to if both top and bottom surfaces were exposed. This prevents changes in the surface area of dissolvable region 102 which may otherwise occur if water were allowed to contact bottom surface 108, so that the surface area along which dissolution is occurring at any given time remains substantially constant.

A relatively high aspect ratio of the diameter (in the case of a cylinder) or width of the shaped dissolvable region relative to the height of the dissolvable region is also helpful in maintaining a relatively constant dissolution rate. For example, where the diameter or width of region 102 is greater than the height of region 102, this maximizes the fraction of the exterior surface area of the cylinder or other shaped composition that is located along the top surface, while that surface area which is located along the peripheral surface is minimized.

This is helpful because as the dissolvable region 102 is progressively dissolved, the top surface 106 provides the same surface area, but the surface area provided by peripheral surface 110 changes as the height of region 102 decreases. This is important as some water may contact peripheral region 110 so that dissolution occurs at this surface as well as top surface 106. This introduces a variable surface area along which dissolution is occurring as the dissolvable region progressively shrinks due to dissolution. This can be undesirable to the extent it results in changes to the concentration of functional agent provided within the delivered stream of water.

It can thus be preferable to limit the surface area associated with peripheral surface 110, to limit contact of the water stream with surface 110, and perhaps even to provide a non-dissolvable portion to cover peripheral surface 110 so as to minimize or prevent dissolution from occurring at this surface. As discussed above, it is preferable for dissolution to occur only along top surface 106 so as to provide a substantially uniform concentration of a functional agent to the flowing stream of water (e.g., that may be directed to contact top surface 106).

As explained, in one embodiment, the aspect ratio of the width of region 102 to height of region 102 is at least about 1, at least about 1.5, at least about 2, at least about 3, or at least about 5. For example, according to one embodiment, the region 102 may have a diameter of about 3 cm and a height of about 0.6 cm, providing an aspect ratio of about 5. Relatively higher aspect ratios minimize any negative effect that peripheral surface 110 may have on the total surface area along which dissolution is occurring at any given time. In one aspect, this is because the great majority of the exterior surface area is located along the top surface rather than the peripheral surface.

In one embodiment, the shaped composition, including both dissolvable region 102 and non-dissolvable region 104 may comprise a hollow cylinder. In some embodiments, it may even be possible to provide a shaped composition without the non-dissolvable backing layer where the aspect ratio is particularly high (e.g., about 2 or more, 3 or more, or 4 or more). Of course, including a non-dissolvable layer or region in such embodiments may provide even more uniform delivery of the functional agent.

In one embodiment, the shaped composition, including the non-dissolvable region 104 may comprise an indicating feature. Such an indicating feature may include a contrastingly colored portion of region 104 that is adjacent to surface 108. For example, where the non-dissolvable region and dissolvable regions are lightly colored, at least a portion of a top surface of region 104 may be colored (e.g., red, blue, purple, black, green, etc.) to contrast with the color(s) of regions 102 and 104, so as to be apparent to the user when the dissolvable region 102 is substantially exhausted. This indicates that the entire shaped composition 100 should be replaced, as the functional ingredient of region 102 has been substantially exhausted.

In one embodiment, the contrastingly colored surface of region 104 may not necessarily be horizontal or flat as shown in FIG. 3, but may include a portion that protrudes towards dissolvable region 102. As dissolvable region 102 is progressively dissolved away through height reduction, the protruding portion of region 104 will become visible before adjacent "lower" portions of region 104 because the height dimension of the dissolvable region 102 at these locations is thinner than adjacent locations.

Figure 3A:
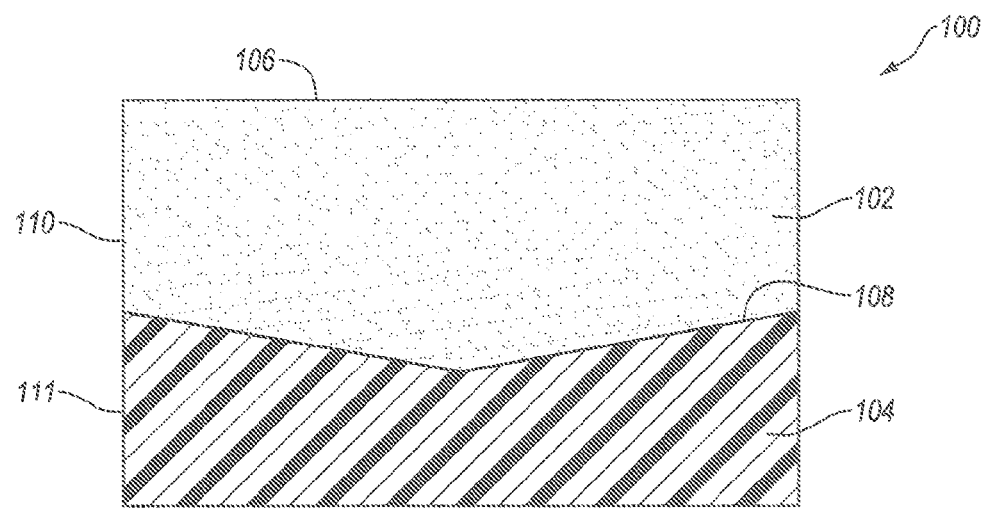
FIG. 3A is a cross-sectional view through an alternative composition similar to that shown in FIG. 3, but including an indicating feature for indicating to the user that the shaped composition should be replaced.
Figure 3B:
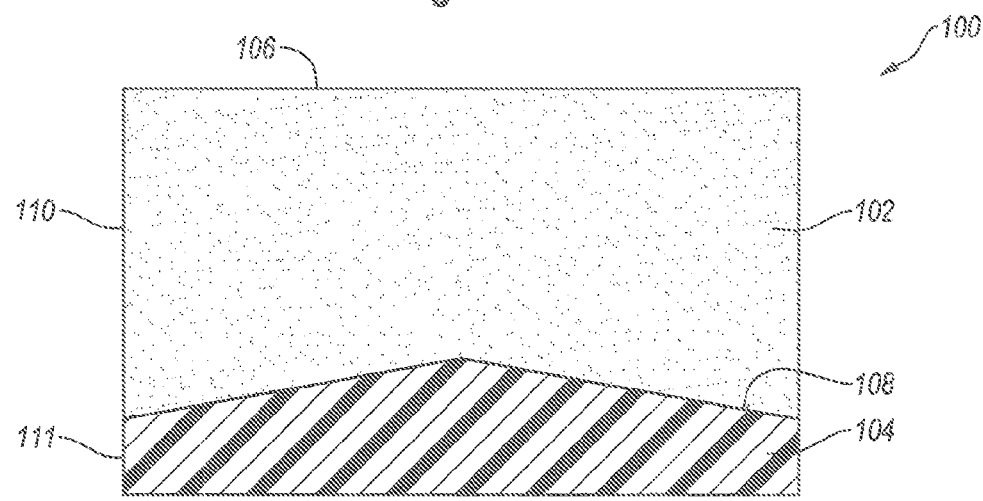
FIG. 3B is a cross-sectional view through another shaped composition including an alternative indicating feature.
Figure 3C:
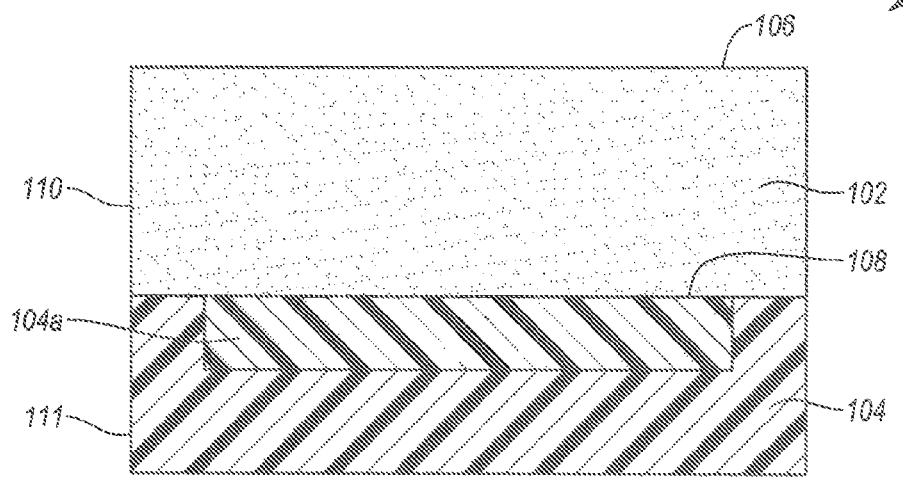
FIG. 3C is a cross-sectional view through another shaped composition including an alternative indicating feature.

For example FIG. 3A shows an embodiment in which the portions adjacent peripheral edge 111 of non-dissolvable region 104 are thicker than a central portion of region 104. As such, as dissolvable region 102 is progressively dissolved through height reduction, the thicker peripheral portion adjacent edge 111 will show through dissolvable region 102 once sufficient dissolution of region 102 has occurred. FIG. 3B shows an alternative embodiment in which the central portion of region 104 is thicker than peripheral portion adjacent edge 111. As such, as dissolvable region 102 is progressively dissolved, the thicker central portion of region 104 will show through dissolvable region 102, indicating a need to replace the shaped composition.

In other words, in each case, the thickness of dissolvable portion 102 is not constant, but includes a thinner portion which will be dissolved through fastest, and the underlying contrastingly colored non-dissolvable surface top surface of region 104 adjacent bottom surface 108 will show through, indicating to the user that the shaped composition should be replaced. The faucet mountable device retaining the shaped composition may be transparent of include a transparent window portion to allow the user to more easily visually observe such an indicator feature. Alternative indicating features will be apparent to one of skill in the art in light of the present disclosure.

In one embodiment, the indicating feature may include a mechanical mechanism to prevent the device within which the shaped composition is housed from operating further until the exhausted shaped composition has been replaced.

One or more functional agents are included in the dissolvable region of the shaped composition to provide a functional benefit that may include, but not limited to, antimicrobial sanitation, pleasant fragrance, improve soil removal, increase wetting, inhibit corrosion, or provide other desirable benefits. Exemplary functional agents include, but are not limited to, an antimicrobial sanitizing agent, a pH adjusting agent, a surfactant, a hydrotrope, a wetting agent, a mineral, a vitamin, a penetrant, a chelating agent, an odor masking agent, an odor absorbing agent, a colorant, a fluorescent whitening agent, a flavoring agent, a fragrance, a sweetener, a potentiator, a sporulation agent, a corrosion inhibitor, a therapeutic agent, a viscosity modifier, a foam stabilizer, a foam booster, a defoamer, a stain and soil repellent, an enzyme, a cloud point modifier, a dispersant, a catalyst, an activating agent, a water softening agent, and combinations thereof.

More than one functional agent may be included to provide multiple benefits. In some cases, combinations of different types of functional agents may be provided. For example, one shaped composition may include an odor absorbing agent and an odor masking agent or fragrance to provide better odor control than when only one of these agents are present. In another example, combining surfactants with hydrotropes or wetting agents may synergistically enhance cleaning or antimicrobial properties.

The functional agents may be present in the dissolvable region at a level of from about 0.1% to about 100%, from about 0.1% to about 80%, from about 0.1% to about 60%, from about 0.1% to about 40%, from about 0.1% to about 20%, from about 0.1% to about 15%, from about 0.1% to about 10%, from about 0.1% to about 5%, from about 0.1% to about 1%, from about 0.01% to about 1%, from about 5% to about 50%, from about 5% to about 25%, from about 5% to about 15%, from about 5% to about 10%, from about 10% to about 60%, from about 10% to about 40%, from about 10% to about 20%, from about 20% to about 60%, about 20% to about 40%, about 15% to about 25%, about 50% to about 100%, about 60% to about 100%, about 70% to about 100%, about 80% to about 100%, or about 90% to about 100%.

The dissolvable region can comprise a functional agent that becomes entrained, dissolved, or otherwise introduced into the flowing stream of water. In one embodiment, the functional agent comprises an antimicrobial sanitizing agent. Examples of such sanitizing agents include, but are not limited to, hypochlorites, peroxides, quaternary ammonium compounds, silver salts, N-halogen compounds, or antimicrobial organic acids such as citric acid, lactic acid, lauric acid, and/or glycolic acid. In one embodiment, the dissolvable region comprises a solid. In another embodiment, it may comprise a gel. Liquid antimicrobial sanitizing agents (e.g., an organic acid or an aqueous or other liquid carrier solution of a peroxide or hypochlorite) may be incorporated within such a gel.

Exemplary hypochlorites include, but are not limited to, hypochlorite salts of alkaline or alkaline earth metals. Particularly preferred materials include calcium hypochlorite, magnesium hypochlorite, and mixtures thereof. In one embodiment, the functional agent contains no sodium hypochlorite. Exemplary peroxides include, but are not limited to, aqueous hydrogen peroxide, solid complexes of hydrogen peroxide, and mixtures thereof. Non-limiting examples of solid complexes of hydrogen peroxide include, but are not limited to, carbamide peroxide and metal perborates (e.g., sodium perborate), metal percarbonates (e.g., sodium percarbonate), metal peroxides, metal chlorites, metal peroxy acids, metal peroxy acid salts, and mixtures thereof. The metals may typically be alkaline or alkaline earth metals. In one embodiment, a peroxide may be formed in-situ by providing a sugar (e.g., glucose) into the stream of water, which stream of water then contacts another layer or region including a sugar oxidase (e.g., glucose oxidase), which forms the desired sanitizing peroxide.

Exemplary quaternary ammonium compounds include, but are not limited to, quaternary ammonium organohalides such as benzalkonium chloride, alkyl benzyl dimethyl ammonium halide, alkyl dimethyl ethyl benzyl ammonium halide, n-alkyl dimethyl benzyl ammonium halide, diisobutyl phenoxy ethoxy ethyl dimethyl benzyl ammonium halide, n-($C_{12}C_{14}C_{16}$) alkyl dimethyl benzyl ammonium halide, dodecyl dimethyl ammonium halide, dioctyl dimethyl ammonium halide, dialkyl dimethyl ammonium halide, dialkyl methyl benzyl ammonium halide, octyl decyl dimethyl ammonium halide, lauryl dimethyl benzyl ammonium halide, o-benzyl-p-chlorophenol, dideryl dimethyl ammonium halide, dioctyl dimethyl ammonium halide, alkyl ($C_{14}C_{12}C_{16}$) dimethyl benzyl ammonium halide, and mixtures thereof. In one embodiment, the quaternary ammonium compound may include an alkyl group having between about 6 to about 18 carbon atoms.

Exemplary N-halogen compounds include trichloro-s-triazinetrione, trichloromelamine, 1,3-dichloro-5 ethyl-5 methylhydantoin, 1,3-dichloro-5-5-dimethylhydantoin, sodium dichloroisocyanurate, and mixtures thereof. Preferably, any included N-halogen compounds do not produce gaseous diatomic halogens (e.g., $F_2$, $Cl_2$, $Br_2$, $I_2$, etc.) during use (e.g., upon exposure to water).

In another embodiment, the functional agent comprises a surfactant. The term "surfactant", as used herein, refers to and includes a substance or compound that reduces surface tension when dissolved in water or aqueous solutions, or that reduces interfacial tension between two liquids, or between a liquid and a solid. The term "surfactant" thus includes anionic, nonionic, cationic, zwiterrionic and/or amphoteric agents.

The dissolvable region may contain one or more surfactants selected from nonionic, anionic, cationic, ampholytic, amphoteric and zwitterionic surfactants and mixtures thereof. Preferably, any surfactant is present in the dissolvable region of the composition. A typical listing of anionic, ampholytic, and zwitterionic classes, and species of these surfactants, is given in U.S. Pat. No. 3,929,678 to Laughlin and Heuring. A list of suitable cationic surfactants is given in U.S. Pat. No. 4,259,217 to Murphy, each of which is herein incorporated by reference.

The dissolvable region may comprise an anionic surfactant. Essentially any anionic surfactants useful for detersive purposes can be used in the cleaning composition. These can include salts (including, for example, sodium, potassium, ammonium, and substituted ammonium salts such as mono-, di- and tri-ethanolamine salts) of the anionic sulfate, sulfonate, carboxylate and sarcosinate surfactants. Anionic surfactants may comprise a sulfonate or a sulfate surfactant. Anionic surfactants may comprise an alkyl sulfate, a linear or branched alkyl benzene sulfonate, or an alkyldiphenyloxide disulfonate, as described herein.

Other anionic surfactants include the isethionates such as the acyl isethionates, N-acyl taurates, fatty acid amides of methyl tauride, alkyl succinates and sulfosuccinates, monoesters of sulfosuccinate (for instance, saturated and unsaturated $C_{12}$-$C_{18}$ monoesters) diesters of sulfosuccinate (for instance saturated and unsaturated $C_6$-$C_{14}$ diesters), N-acyl sarcosinates. Resin acids and hydrogenated resin acids are also suitable, such as rosin, hydrogenated rosin, and resin acids and hydrogenated resin acids present in or derived from tallow oil. Anionic sulfate surfactants suitable for use herein include the linear and branched primary and secondary alkyl sulfates, alkyl ethoxysulfates, fatty oleoyl glycerol sulfates, alkyl phenol ethylene oxide ether sulfates, the $C_5$-$C_{17}$acyl-N-($C_1$-$C_4$ alkyl) and —N—($C_1$-$C_2$ hydroxyalkyl) glucamine sulfates, and sulfates of alkylpolysacchanides such as the sulfates of alkylpolyglucoside (the nonionic nonsulfated compounds being described herein). Alkyl sulfate surfactants may be selected from the linear and branched primary $C_{10}$-$C_{18}$ alkyl sulfates, the $C_{11}$-$C_{15}$ branched chain alkyl sulfates, or the $C_{12}$-$C_{14}$ linear chain alkyl sulfates.

Alkyl ethoxysulfate surfactants may be selected from the group consisting of the $C_{10}$-$C_{18}$ alkyl sulfates, which have been ethoxylated with from about 0.5 to about 20 moles of ethylene oxide per molecule. The alkyl ethoxysulfate surfactant may be a $C_{11}$-$C_{18}$, or a $C_{11}$-$C_{15}$ alkyl sulfate which has been ethoxylated with from about 0.5 to about 7, or from about 1 to about 5, moles of ethylene oxide per molecule. One embodiment may include mixtures of the alkyl sulfate and/or sulfonate and alkyl ethoxysulfate surfactants. Such mixtures have been disclosed in PCT Patent Application No. WO 93/18124, herein incorporated by reference.

Anionic sulfonate surfactants suitable for use herein include the salts of $C_5$-$C_{20}$ linear alkylbenzene sulfonates, alkyl ester sulfonates, $C_6$-$C_{22}$ primary or secondary alkane sulfonates, $C_6$-$C_{24}$ olefin sulfonates, sulfonated polycarboxylic acids, alkyl glycerol sulfonates, fatty acyl glycerol sulfonates, fatty oleyl glycerol sulfonates, and any mixtures thereof. Suitable anionic carboxylate surfactants include alkyl ethoxy carboxylates, alkyl polyethoxy polycarboxylate surfactants and soaps ("alkyl carboxyls"), especially certain secondary soaps as described herein. Suitable alkyl ethoxy carboxylates include those with the formula

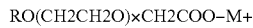

wherein R is a $C_6$ to $C_{18}$ alkyl group, x ranges from 0 to 10, and the ethoxylate distribution is such that, on a weight basis, the amount of material where x is 0 is less than 20% and M is a cation. Suitable alkyl polyethoxypolycarboxylate surfactants include those having the formula RO—(CHR$_1$—CHR$_2$—O)—R$_3$ wherein R is a $C_6$ to $C_{18}$ alkyl group, x is from 1 to 25, R$_1$ and R$_2$ are selected from the group consisting of hydrogen, methyl acid radical, succinic acid radical, hydroxysuccinic acid radical, and mixtures thereof, and R$_3$ is selected from the group consisting of hydrogen, substituted or unsubstituted hydrocarbons having between 1 and 8 carbon atoms, and mixtures thereof.

Suitable soap surfactants include the secondary soap surfactants, which contain a carboxyl unit connected to either a primary or secondary carbon. Suitable secondary soap surfactants for use herein are water-soluble members selected from the group consisting of water-soluble salts of 2-methyl-1-undecanoic acid, 2-ethyl-1-decanoic acid, 2-propyl-1-nonanoic acid, 2-butyl-1-octanoic acid and 2-pentyl-1-heptanoic acid. Certain soaps may also be included as suds suppressors.

Other suitable anionic surfactants are the alkali metal sarcosinates of formula R—CON (R$_1$) CH—)COOM, wherein R is a $C_5$-$C_{17}$ linear or branched alkyl or alkenyl group, R$_1$ is a $C_1$-$C_4$ alkyl group and M is an alkali metal ion. Examples are the myristyl and oleoyl methyl sarcosinates in the form of their sodium salts.

Other suitable surfactants include fatty acid sarosinates which are mild, biodegradable anionic surfactants derived from fatty acids and sarcosine (amino acid). Sarcosine is the N-methyl derivative of glycine. Sarcosine is a natural amino acid found in muscles and other tissues. Sarcosine is found naturally as an intermediate in the metabolism of choline to glycine. In a preferred embodiment, the sarcosines are acyl sarcosines. Examples of acyl sarcosines include, but are not limited to, cocoyl sarcosine, lauroyl sarcosine, myristoyl sarcosine, oleoyl sarcosine, and stearoyl sarcosine which are modified fatty acids. The salts of acyl sarcosines are referred to as acyl sarcosinates. Acyl sarcosinates useful herein include, for example, those having a formula:

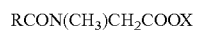

wherein R is an alkyl or alkenyl having from about 8 to about 22 carbon atoms, preferably from about 12 to about 18 carbon atoms, more preferably from about 12 to about 14 carbon atoms, and X is a sodium, potassium, ammonium, or triethanolamine.

Examples of acyl sarcosinates that can be used with the present invention include, but are not limited to, sodium coccyl sarcosinate, sodium lauroyl sarcosinate and sodium myristoyl sarcosinate, sodium oleoyl sarcosinate, sodium stearoyl sarcosinate, ammonium coccyl sarcosinate, ammonium lauroyl sarcosinate and ammonium myristoyl sarcosinate, ammounium oleoyl sarcosinate and ammonium stearoyl sarcosinate. Commercially available preferred acyl sarcosinates include, but are not limited to, sodium lauroyl sarcosinate having the tradename HAPMOSYL L30 which is available from Hampshire Chemicals, and sodium cocoyl sarcosinate having the tradename HAMPOSYL C30, also available from Hampshire Chemicals.

Other suitable surfactants include fatty alcohol sulfates which have a higher alcohol or alkyl group normally in the range of about 10 to about 18 carbon atoms. The cation will almost invariably be sodium or will include sodium, although other cations, such as triethanolamine, potassium, ammonium, magnesium and calcium may also be used. Preferred fatty alcohol sulfates are those wherein the fatty alcohol is essentially saturated and is of a carbon content within the 10 to 18 carbon atoms range, preferably 10 or 12 to 14 or 16 carbon atoms, such as 12 to 16, or that is derived from coconut oil (coco), palm oil, or palm kernel oil.

Lauryl sulfates, and particularly, sodium lauryl sulfate, are preferred primary detergents but such designation also may apply to such detergents wherein the carbon chain length of the alcohol is not limited to about 12 carbon atoms, but is primarily (over 50% and normally over 70% or 75%) of 12 to 14 carbon atoms. Such materials may be obtained from natural sources, such as coconut oil and palm kernel oil. In one embodiment, the fatty alcohol sulfate is a $C_{12}$-$C_{15}$ fatty alcohol sulfate. In another embodiment, the fatty alcohol sulfate is a $C_{12}$-$C_{16}$ fatty alcohol sulfate. In another embodiment, the fatty alcohol sulfate is a $C_{12}$-$C_{14}$ fatty alcohol sulfate. In another embodiment, the fatty alcohol is a $C_{12}$ fatty alcohol sulfate. In another embodiment, the fatty alcohol sulfate is sodium lauryl sulfate. In a specific embodiment, the fatty alcohol sulfate is a sodium coco fatty alcohol sulfate.

Suitable amphoteric surfactants for use herein include amine oxide surfactants and alkyl amphocarboxylic acids.

Suitable amine oxides include those compounds having the formula $R_3(OR_4)XNO(R_5)_2$ wherein $R_3$ is selected from an alkyl, hydroxyalkyl, acylamidopropyl and alkylphenyl group, or mixtures thereof, containing from about 8 to about 26 carbon atoms; $R_4$ is an alkylene or hydroxyalkylene group containing from 2 to 3 carbon atoms, or mixtures thereof, x is from 0 to 5, preferably from 0 to 3; and each $R_5$ is an alkyl or hydroxyalkyl group containing from 1 to 3, or a polyethylene oxide group containing from 1 to 3 ethylene oxide groups. Suitable amine oxides are $C_{10}$-$C_{18}$ alkyl dimethylamine oxide, and $C_{10}$-$C_{18}$ acylamido alkyl dimethylamine oxide. A suitable example of an alkyl amphodicarboxylic acid is MIRANOL C2M Conc. manufactured by Miranol, Inc., Dayton, N.J.

Zwitterionic surfactants can also be incorporated into the shaped compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Suitable betaines are those compounds having the formula $R(R_1)_2N+R_2COO-$ wherein R is a $C_6$-$C_{18}$ hydrocarbyl group, each $R_1$ is typically a $C_1$-$C_3$ alkyl, and $R_2$ is a $C_1$-$C_5$ hydrocarbyl group. Suitable betaines are $C_{12-18}$ dimethylammonio hexanoate and the $C_{10}$-$C_{18}$ acylamidopropane (or ethane) dimethyl (or diethyl) betaines. Complex betaine surfactants are also suitable for use herein.

Suitable cationic surfactants to be used herein include the quaternary ammonium surfactants. The quaternary ammonium surfactant may be a mono $C_6$-$C_{16}$, or a $C_6$-$C_{10}$ N-alkyl or alkenyl ammonium surfactant wherein the remaining N positions are substituted by methyl, hydroxyethyl or hydroxypropyl groups. Suitable are also the mono-alkoxylated and bis-alkoxylated amine surfactants. Additional suitable cationic surfactants include coco fatty acid diethanolamine, hydrogenated palm tea ester quat, and cationic ethyoxylate fatty acids.

Another suitable group of cationic surfactants, which can be used in the shaped compositions, are cationic ester surfactants. The cationic ester surfactant is a compound having surfactant properties comprising at least one ester (i.e. $-COO-$) linkage and at least one cationically charged group. Suitable cationic ester surfactants, including choline ester surfactants, have for example been disclosed in U.S. Pat. Nos. 4,228,042, 4,239,660 and 4,260,529, each of which is herein incorporated by reference. The ester linkage and cationically charged group may be separated from each other in the surfactant molecule by a spacer group of a chain comprising at least three atoms (i.e. of three atoms chain length), or from three to eight atoms, or from three to five atoms, or three atoms. The atoms forming the spacer group chain are selected from the group consisting of carbon, nitrogen, oxygen, and any mixtures thereof, with the proviso that any nitrogen or oxygen atoms in said chain connect only with carbon atoms in the chain. Thus spacer groups having, for example, $-O-O-$ (i.e. peroxide), $-N-N-$, and $-N-O-$ linkages are excluded, whilst spacer groups having, for example $-CH_2-O-$, $CH_2-$ and $-CH_2-NH-CH_2-$ linkages are included. The spacer group chain may comprise only carbon atoms, or the chain is a hydrocarbyl chain.

The dissolvable region may comprise cationic mono-alkoxylated amine surfactants, for instance, of the general formula: $R_1R_2R_3N+A_pR_4$ X- wherein $R_1$ is an alkyl or alkenyl moiety containing from about 6 to about 18 carbon atoms, or from 6 to about 16 carbon atoms, or from about 6 to about 14 carbon atoms; $R_2$ and $R_3$ are each independently alkyl groups containing from one to about three carbon atoms, for instance, methyl, for instance, both $R_2$ and $R_3$ are methyl groups; $R_4$ is selected from hydrogen, methyl and ethyl; X- is an anion such as chloride, bromide, methylsulfate, sulfate, or the like, to provide electrical neutrality; A is a alkoxy group, especially a ethoxy, propoxy or butoxy group and p is from 0 to about 30, or from 2 to about 15, or from 2 to about 8. The $A_pR_4$ group in the formula may have p=1 and is a hydroxyalkyl group, having no greater than 6 carbon atoms whereby the $-OH$ group is separated from the quaternary ammonium nitrogen atom by no more than 3 carbon atoms. Suitable $A_pR_4$ groups are $-CH_2CH_2-OH$, $-CH_2CH_2CH_2-OH$, $-CH_2CH(CH_3)-OH$ and $-CH(CH_3)CH_2-OH$. Suitable $R_1$ groups are linear alkyl groups, for instance, linear $R_1$ groups having from 8 to 14 carbon atoms.

Suitable cationic mono-alkoxylated amine surfactants for use herein are of the formula $R_1(CH_3)(CH_3)N+(CH_2CH_2O)_2$ $-5H$ X- wherein $R_1$ is $C_{10}$-$C_{18}$ hydrocarbyl and mixtures thereof, especially $C_{10}$-$C_{14}$ alkyl, or $C_{10}$ and $C_{12}$ alkyl, and X is any convenient anion to provide charge balance, for instance, chloride or bromide.

As noted, compounds of the foregoing type include those wherein the ethoxy ($CH_2CH_2O$) units (EO) are replaced by butoxy, isopropoxy [$CH(CH_3)CH_2O$] and [$CH_2CH(CH_3)O$] units (i-Pr) or n-propoxy units (Pr), or mixtures of EO and/or Pr and/or i-Pr units.

The cationic bis-alkoxylated amine surfactant may have the general formula: $R_1R_2N+A_pR_3A'_qR_4$ X- wherein $R_1$ is an alkyl or alkenyl moiety containing from about 8 to about 18 carbon atoms, or from 10 to about 16 carbon atoms, or from about 10 to about 14 carbon atoms; $R_2$ is an alkyl group containing from one to three carbon atoms, for instance, methyl; $R_3$ and $R_4$ can vary independently and are selected from hydrogen, methyl and ethyl, X- is an anion such as chloride, bromide, methylsulfate, sulfate, or the like, sufficient to provide electrical neutrality. A and A' can vary independently and are each selected from $C_1$-$C_4$ alkoxy, for instance, ethoxy, (i.e., $-CH_2CH_2O-$), propoxy, butoxy and mixtures thereof, p is from 1 to about 30, or from 1 to about 4 and q is from 1 to about 30, or from 1 to about 4, or both p and q are 1.

Suitable cationic bis-alkoxylated amine surfactants for use herein are of the formula $R_1CH_3N+(CH_2CH_2OH)(CH_2CH_2OH)$ X-, wherein $R_1$ is $C_{10}$-$C_{18}$ hydrocarbyl and mixtures thereof, or $C_{10}$, $C_{12}$, $C_{14}$ alkyl and mixtures thereof, X- is any convenient anion to provide charge balance, for example, chloride. With reference to the general cationic bis-alkoxylated amine structure noted above, since in one example compound $R_1$ is derived from (coconut) $C_{12}$-$C_{14}$ alkyl fraction fatty acids, $R_2$ is methyl and $A_pR_3$ and $A'_qR_4$ are each monoethoxy.

Other cationic bis-alkoxylated amine surfactants useful herein include compounds of the formula: $R_1R_2N+-(CH_2CH_2O)_pH-(CH_2CH_2O)_qH$ X- wherein $R_1$ is $C_{10}$-$C_{18}$ hydrocarbyl, or $C_{10}$-$C_{14}$ alkyl, independently p is 1 to about 3 and q is 1 to about 3, $R_2$ is $C_1$-$C_3$ alkyl, for example, methyl, and X- is an anion, for example, chloride or bromide.

Other compounds of the foregoing type include those wherein the ethoxy ($CH_2CH_2O$) units (EO) are replaced by butoxy (Bu) isopropoxy [$CH(CH_3)CH_2O$] and [$CH_2CH(CH_3)O$] units (i-Pr) or n-propoxy units (Pr), or mixtures of EO and/or Pr and/or i-Pr units.

The dissolvable region may include at least one fluorosurfactant selected from nonionic fluorosurfactants, cationic fluorosurfactants, and mixtures thereof which are soluble or dispersible in aqueous compositions, sometimes compositions which do not include further detersive surfactants, or further organic solvents (e.g., in the case of gels), or both. Suitable nonionic fluorosurfactant compounds are found among the materials presently commercially marketed under the tradename FLUORAD (ex. 3M Corp.) Exemplary fluorosurfactants include those sold as FLUORAD FC-740, generally described to be fluorinated alkyl esters; FLUORAD FC-430, generally described to be fluorinated alkyl esters; FLUORAD FC-431, generally described to be fluorinated alkyl esters; and, FLUORAD FC-170-C, which is generally described as being fluorinated alkyl polyoxyethlene ethanols.

An example of a suitable cationic fluorosurfactant compound has the following structure: $C_nF_{2n}+1SO_2NHC_3H_6N+(CH_3)_3I^-$ where n~8. This cationic fluorosurfactant is available under the tradename FLUORAD FC-135 from 3M. Another example of a suitable cationic fluorosurfactant is F3

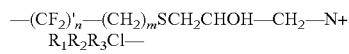
—(CF$_2$)'$_n$—(CH$_2$)$_m$SCH$_2$CHOH—CH$_2$—N+
R$_1$R$_2$R$_3$Cl— wherein: n is 5-9 and m is 2, and $R_1$, $R_2$ and $R_3$ are —$CH_3$. This cationic fluorosurfactant is available under the tradename ZONYL FSD (available from DuPont, described as 2-hydroxy-3-((gamma-omega-perfluoro-$C_6$-$C_{20}$-alkyl)thio)-N,N,N-trimethyl-1-propyl ammonium chloride). Other cationic fluorosurfactants suitable for use in the present invention are also described in EP 866,115 to Leach and Niwata, herein incorporated by reference. The fluorosurfactant selected from the group of nonionic fluorosurfactant, cationic fluorosurfactant, and mixtures thereof may be present in amounts of from 0.001 to 5% wt., preferably from 0.01 to 1% wt., and more preferably from 0.01 to 0.5% by weight.

The composition may comprise a nonionic surfactant. Essentially any alkoxylated nonionic surfactants are suitable herein, for instance, ethoxylated and propoxylated nonionic surfactants. Alkoxylated surfactants can be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylene diamine adducts.

The condensation products of aliphatic alcohols with from about 1 to about 25 moles of alkylene oxide, particularly ethylene oxide and/or propylene oxide, are suitable for use herein. The alkyl chain of the aliphatic alcohol can either be straight or branched, primary or secondary, and generally contains from about 6 to about 22 carbon atoms. Also suitable are the condensation products of alcohols having an alkyl group containing from about 8 to about 20 carbon atoms with from about 2 to about 10 moles of ethylene oxide per mole of alcohol.

Polyhydroxy fatty acid amides suitable for use herein are those having the structural formula $R_2CONR_1Z$ wherein: $R_1$ is H, $C_1$-$C_4$ hydrocarbyl, 2-hydroxyethyl, 2-hydroxypropyl, ethoxy, propoxy, or a mixture thereof, for instance, $C_1$-$C_4$ alkyl, or $C_1$ or $C_2$ alkyl; and $R_2$ is a $C_5$-$C_{31}$ hydrocarbyl, for instance, straight-chain $C_5$-$C_{19}$ alkyl or alkenyl, or straight-chain $C_9$-$C_{17}$ alkyl or alkenyl, or straight-chain $C_{11}$-$C_{17}$ alkyl or alkenyl, or mixture thereof-, and Z is a polyhydroxyhydrocarbyl having a linear hydrocarbyl chain with at least 3 hydroxyls directly connected to the chain, or an alkoxylated derivative (for example, ethoxylated or propoxylated) thereof. Z may be derived from a reducing sugar in a reductive amination reaction, for example, Z is a glycityl.

Suitable fatty acid amide surfactants include those having the formula: $R_1CON(R_2)_2$ wherein $R_1$ is an alkyl group containing from 7 to 21, or from 9 to 17 carbon atoms and each $R_2$ is selected from the group consisting of hydrogen, $C_1$-$C_4$ alkyl, $C_1$-$C_4$ hydroxyalkyl, and —$(C_2H_4O)_xH$, where x is in the range of from 1 to 3.

Suitable alkylpolysaccharides for use herein are disclosed in U.S. Pat. No. 4,565,647 to Llenado, herein incorporated by reference, having a hydrophobic group containing from about 6 to about 30 carbon atoms and a polysaccharide, e.g., a polyglycoside, hydrophilic group containing from about 1.3 to about 10 saccharide units. Alkylpolyglycosides may have the formula: $R_2O(C_nH_{2n}O)_t(glycosyl)_x$ wherein $R_2$ is selected from the group consisting of alkyl, alkylphenyl, hydroxyalkyl, hydroxyalkylphenyl, and mixtures thereof in which the alkyl groups contain from about 10 to about 18 carbon atoms; n is 2 or 3; t is from 0 to about 10, and x is from about 1.3 to about 8. The glycosyl may be derived from glucose.

Other suitable nonionic surfactants are food safe nonionic surfactants. Examples of food safe nonionic surfactants are sucrose esters, such as sucrose cocoate available from Croda, and sorbitan esters, such as polyoxyethylene(20) sorbitan monooleate from J. T. Baker and polyoxyethylene(20) sorbitan monolaurate from Uniquema. Other examples of food safe nonionic surfactants are given in Generally Recognized As Safe (GRAS) lists, as described below.

The dissolvable region may comprise at least one alkyl polyglucoside ("APG") surfactant. Suitable alkyl polyglucoside surfactants are the alkylpolysaccharides that are disclosed in U.S. Pat. No. 5,776,872 to Giret et al.; U.S. Pat. No. 5,883,059 to Furman et al.; U.S. Pat. No. 5,883,062 to Addison et al.; and U.S. Pat. No. 5,906,973 to Ouzounis et al., which are all incorporated by reference. Suitable alkyl polyglucosides for use herein are also disclosed in U.S. Pat. No. 4,565,647 to Llenado describing alkylpolyglucosides having a hydrophobic group containing from about 6 to about 30 carbon atoms, or from about 10 to about 16 carbon atoms and polysaccharide, e.g., a polyglycoside, hydrophilic group containing from about 1.3 to about 10, or from about 1.3 to about 3, or from about 1.3 to about 2.7 saccharide units.

Optionally, there can be a polyalkyleneoxide chain joining the hydrophobic moiety and the polysaccharide moiety. A suitable alkyleneoxide is ethylene oxide. Typical hydrophobic groups include alkyl groups, either saturated or unsaturated, branched or unbranched containing from about 8 to about 18, or from about 10 to about 16, carbon atoms. Suitably, the alkyl group can contain up to about 3 hydroxy groups and/or the polyalkyleneoxide chain can contain up to about 10, or less than about 5, alkyleneoxide moieties. Suitable alkyl polysaccharides are octyl, nonyldecyl, undecyldodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses and/or galactoses. Suitable mixtures include coconut alkyl, di-, tri-, tetra-, and pentaglucosides and tallow alkyl tetra-, penta-, and hexaglucosides.

Suitable alkylpolyglycosides (or alkylpolyglucosides) have the formula:

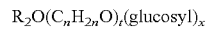
$R_2O(C_nH_{2n}O)_t(glucosyl)_x$ wherein $R_2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is about 2 or about 3, preferably about 2; t is from 0 to about 10, preferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominantly the 2-position.

A group of alkyl glycoside surfactants suitable for use in the practice of this invention may be represented by formula I below:

$$RO—(R^2O)_y—(G)_xZ_b \quad\quad I$$

wherein R is a monovalent organic radical containing from about 6 to about 30 (preferably from about 8 to about 18) carbon atoms; $R^2$ is a divalent hydrocarbon radical containing from about 2 to about 4 carbon atoms; O is an oxygen atom; y is a number which has an average value from about 0 to about 1 and is preferably 0; G is a moiety derived from a reducing saccharide containing 5 or 6 carbon atoms; and x is a number having an average value from about 1 to 5 (preferably from 1.1 to 2); Z is $O_2M^1$, $O_2CR^3$, $O(CH_2)$, $CO_2M^1$, $OSO_3M^1$, or $O(CH_2)SO_3M^1$; $R^3$ is $(CH_2)CO_2M^1$ or $CH=CHCO_2M^1$; (with the proviso that Z can be $O_2M^1$ only if Z is in place of a primary hydroxyl group in which the primary hydroxyl-bearing carbon atom. —$CH_2OH$, is oxidized to form a —$CO_2M^1$ group); b is a number from 0 to 3x+1 preferably an average of from 0.5 to 2 per glycosal group; p is 1 to 10, $M^1$ is $H^+$ or an organic or inorganic cation, such as, for example, an alkali metal, ammonium, monoethanolamine, or calcium. As defined in Formula I, R is generally the residue of a fatty alcohol having from about 8 to about 30 or about 8 to about 18 carbon atoms.

Suitable alkylglycosides include, for example, APG 325 (a $C_9$-$C_{11}$ alkyl polyglycoside available from Cognis Corporation), APG 625 (a $C_{10}$-$C_{16}$ alkyl polyglycoside available from Cognis Corporation), DOW TRITON CG110 (a $C_8$-$C_{10}$ alkyl polyglyco-side available from Dow Chemical Company), AG6202 (a $C_8$ alkyl polyglycoside available from Akzo Nobel) GLUCOPON 425N (a $C_8$-$C_{16}$ alkyl polyglycoside available from Cognis Corporation), GLUCOPON 215 (a $C_8$-$C_{10}$ alkyl polyglycoside available from Cognis Corporation), GLUCOPON 225 (a $C_8$-$C_{10}$ alkyl polyglycoside available from Cognis Corporation) and ALKADET 15 (a $C_8$-$C_{10}$ alkyl polyglycoside available from Huntsman Corporation). A $C_8$ to $C_{10}$ alkylpoly-glucoside includes alkylpoly-glucosides wherein the alkyl group is substantially $C_8$ alkyl, substantially $C_{10}$ alkyl, or a mixture of substantially $C_8$ and $C_{10}$ alkyl. Additionally, short chain APGs such as $C_4$ and/or $C_6$ or mixtures thereof may be suitable with the present invention.

The dissolvable region may include a builder, which can increase the effectiveness of the surfactant. The builder can also function as a softener, a sequestering agent, a buffering agent, or a pH adjusting agent in the composition. A variety of builders or buffers can be used and they include, but are not limited to, phosphate-silicate compounds, zeolites, alkali metal, ammonium and substituted ammonium polyacetates, trialkali salts of nitrilotriacetic acid, carboxylates, polycarboxylates, carbonates, bicarbonates, polyphosphates, aminopolycarboxylates, polyhydroxy-sulfonates, and starch derivatives. Builders, when used, include, but are not limited to, organic acids, mineral acids, alkali metal and alkaline earth salts of silicate, metasilicate, polysilicate, borate, sulfates, hydroxide, carbonate (e.g., sodium carbonate), carbamate, phosphate, polyphosphate, pyrophosphates, triphosphates, tetraphosphates, ammonia, hydroxide, monoethanolamine, monopropanolamine, diethanolamine, dipropanol-amine, triethanolamine, and 2-amino-2methyl-propanol.

Other suitable buffers include ammonium carbamate, citric acid, and acetic acid. Mixtures of any of the above are also acceptable. Useful inorganic buffers/alkalinity sources include ammonia, the alkali metal carbonates and alkali metal phosphates, e.g., sodium carbonate, sodium polyphosphate. For additional buffers see WO 95/07971, which is incorporated herein by reference. Other preferred pH adjusting agents include sodium or potassium hydroxide. The term silicate is meant to encompass silicate, metasilicate, polysilicate, aluminosilicate and similar compounds. Preferred buffers for both the dissolvable and non-dissolvable regions of the shaped composition include carbonate, bicarbonate, sesquicarbonate and mixtures thereof.

The dissolvable region may comprise a water-soluble polymer. In one embodiment, the dissolvable region of the composition can contain a water-soluble polymer. Examples of water-soluble polymer include, but are not limited to, polycarboxylate, sulfonated carboxylate, polysulfonate, polyvinylpyrrolidone ("PVP"), and mixtures thereof.

Examples of polycarboxylate include, but are not limited to, polymers with sufficient carboxylate ions to achieve water solubility. Carboxylate ions may be derived from various monomers including acrylic acid, maleic acid and maleic anhydride. Copolymers of different carboxylate-containing monomers are also suitable as well as copolymers with non carboxylate containing monomers such as methacrylate, acrylonitrile, styrene, ethylene, propylene, and many others. Mixtures of carboxylate containing polymers can also be used.

Suitably, the molecular weight of the water-soluble polymer may be between about 1,000 to about 10,000 daltons, about 1,000 to about 8,000 daltons, about 1,000 to about 6,000 daltons, about 1,000 to about 5,000 daltons, about 1,000 to about 4,000 daltons, about 1,000 to about 2,000 daltons, about 2,000 to about 10,000 daltons, about 2,000 to about 8,000 daltons, about 2,000 to about 6,000 daltons, about 2,000 to about 5,000 daltons, about 2,000 to about 4,000 daltons, about 3,000 to about 10,000 daltons, about 3,000 to about 8,000 daltons, about 3,000 to about 6,000 daltons, about 3,000 to about 5,000 daltons, about 3,000 to about 4,000 daltons, about 4,000 to about 10,000 daltons, about 4,000 to about 8,000 daltons, about 4,000 to about 6,000 daltons, about 5,000 to about 10,000 daltons, about 5,000 to about 7,500 daltons, or about 7,500 to about 10,000 daltons.

Suitably, the water-soluble polymer is present in an amount ranging from about 0.1% to about 60%, about 0.1% to about 50%, about 0.1% to about 40%, about 0.1% to about 30%, about 0.1% to about 20%, about 0.1% to about 15%, about 0.1% to about 10%, about 5% to about 60%, about 5% to about 50%, about 5% to about 40%, about 5% to about 30%, about 5% to about 20%, about 5% to about 10%, about 10% to about 60%, about 10% to about 50%, about 10% to about 40%, about 10% to about 30%, about 10% to 20%, about 20% to about 60%, about 20% to about 50%; about 20% to about 40%, about 20% to about 30%, about 30% to about 60%, about 30% to about 50%, about 30% to about 40%, or about 40% to about 60%.

The composition may also optionally contain a filler. In one embodiment, all regions of the shaped composition comprise a filler. In another embodiment, only the dissolvable region of the composition comprises a filler. In another embodiment, only the non-dissolvable region of the composition comprises a filler. In another embodiment, a third region composition only comprises a filler.

Examples of fillers that can be used with the present invention include, but are not limited to, a carbonate, a bicarbonate, a sesquicarbonate, a chloride, a sulfate, a phosphate, a silicate, borate, a nitrate, an aluminate, a silica-aluminate, a hydroxide, or an oxide compound of alkali metals, alkaline earths, aluminum, zinc and tin including hydrates, mono, di and tribasic compounds, mixed salts, a borate, a clay, a zeolite, and mixtures thereof. Specific examples of fillers include, but are not limited to, sodium carbonate, potassium carbonate, zinc carbonate, calcium carbonate, magnesium carbonate, sodium bicarbonate, potassium bicarbonate; magnesium bicarbonate, sodium sesquicarbonate, sodium chloride, sodium sulfate, zinc sulfate, magnesium sulfate, calcium sulfate, sodium phosphate, sodium aluminum phosphate, disodium hydrogen phosphate, sodium dihydrogen phosphate, nesosilicates, sorosilicates, cyclosilicates, inosilicates (single or double chain), phyllosilicates, tectosilicates, sodium silicate, borax, boric acid, diborates, triborates, tetraborates, metaborates, sodium nitraite, potassium nitrate, calcium nitrate, magnesium nitrate, sodium aluminate, potassion aluminate, tricalcium aluminate, alumina oxide, magnesium oxide, aluminum hydroxide, calcium hydroxide, magnesium hydroxide, calcium hydroxide, calcium oxide, zinc oxide, tin dioxide, titanium dioxide, silica alumina, and zeolite A.

The dissolvable region may comprise one or more hydrotropes for solubilizing the other components of the composition when contacted with water. The hydrotrope solubilizing materials, when used, include, but are not limited to water soluble salts of low molecular weight organic acids such as the alkali metal (sodium and/or potassium) salts of aromatic sulfonic acids, aliphatic sulfates, aliphatic sulfonates, and aliphatic carboxylates. Specific exemplary material's include, but are not limited to, toluene sulfonate, cumene sulfonate, xylene sulfonate, naphthalene sulfonate, methyl naphthalene sulfonate, octyl sulfate, octyl sulfonate, octanoic acid, decanoic acid, and combinations thereof.

The dissolvable region may comprise at least one wetting agent. Wetting of surfaces and penetration into pores and crevices of an object contacting the sanitizing water stream can improve the sanitizing effect. Examples of wetting agents include ingredients described in the sections for water soluble polymers, surfactants, and hydrotropes. Other example wetting agents include nonionic water soluble polymers. These include polymers of ethylene oxide, propylene oxide, copolymers, and mixtures thereof.

The dissolvable region may comprise at least one dispersant. A dispersant may be included to help remove soils and microorganisms from articles and surfaces. Examples of dispersants include ingredients described in the sections for water soluble polymers, surfactants, hydrotropes, and wetting agents.

The dissolvable region may comprise at least one penetrant. A penetrant increases the rate at which the functional agent (e.g., hypochlorite ion or hypochlorous acid) interacts with a microorganism. For example, cationic surfactants may act as phase transfer agents for the hypochlorous acid or hypochlorite ion. Particular exemplary cationic surfactants are alkyltrimethylammonium, alkylpryidinium, and alkylethylmorpholinium salts, in which the alkyl group preferably contains about 4 to about 18 carbon atoms, most preferably about 12 to about 16 carbon atoms. The alkyl chains may be linear or branched or contain an aryl group. The counterion is preferably, but not limited to, chloride, sulfate, methylsulfate, ethylsulfate, or toluene sulfonate.

Other suitable cationic surfactants include dialkyldimethyl ammonium salts, in which the alkyl groups each contain about 4 to about 12 carbon atoms such as dioctyldimethylammonium chloride. Other suitable cationic surfactants may have two quaternary ammonium groups connected by a short alkyl chain such as N-alkylpentamethyl propane diammonium chloride. In the above cationic surfactants the methyl constituents can be completely or partially replaced by other alkyl or aryl constituents such as ethyl, propyl, butyl, benzyl, and ethylbenzyl groups, for example octyldimethylbenzyl ammonium chloride and tetrabutylammonium chloride. Cationic polymers may also function as phase transfer agents. Examples include but are not limited to polymers and copolymers of alkenes with quaternary ammonium groups such as vinyl alkyl trimethylammonium, vinyl N-alkyl pyridinium, and vinyl N-alkylmorpholinium. A preferred cationic polymer is DADMAC, poly diallyl dimethyl ammonium chloride.

A chelating agent may be included in the composition. Exemplary chelating agents include complexing agents such as the amine oxides of amino methylphosphonic acids (e.g. aminotri(methylene phosphonic acid) N-oxide and ethylenediamine tetra(methylene phosphonic acid) N,N'-dioxide), organophosphonates (e.g. 1-hydroxyethylidene-1,1-diphosphonic acid, phosphonohydroxyacetic acid, and 2-phosphono-butane-1,2,4-tricarboxylic acid), organocarboxylates (e.g. dipicolinic acid, 2-oxa-1,3,4 butane tricarboxylate and 2-oxa-1,1,3 propane tricarboxylate), and organo-sulfonates (e.g. sodium xylene sulfonate and sodium methylnaphthalene sulfonate).

Various anionic or zwitterionic surfactants that may bind to cations and inhibit their precipitation are also suitable chelating agents. Preferred surfactants interact with calcium ions and may be classified as lime-scale dispersants. These include $C_6$-$C_{18}$ alkyl betaines (e.g. decylbetaine and cetylbetaine), $C_6$-$C_{18}$ acyl sarcosinates (e.g. sodium lauroyl-sarcosinate), $C_6$-$C_{18}$ acyl $C_1$-$C_6$ alkyl taurates (e.g. sodium cocoylmethyltaurate), and $C_6$-$C_{18}$ alkyl-iminodipropionates (e.g. sodium lauryliminodipropionate), $C_6$-$C_{18}$ alkyl, aryl, or alkylaryl ether sulfates, $C_6$-$C_{18}$ alkyl, aryl, or alkylaryl ether methylsulfonates, $C_6$-$C_{18}$ alkyl, aryl, or alkylaryl ether carboxylates, sulfonated alkyldiphenyloxides (e.g. sodium dodecyldiphenyloxide disulfonate), and mono or di esters of phosphoric acid with $C_4$-$C_{18}$ alkyl, aryl, alkylaryl, alkylether, arylether and alkylarylether alcohols (e.g. disodium octyl phosphate).

Various polymers and oligomers are also suitable chelating agents. These include polycarboxylate polymers made from acrylic acid and maleic acid, optionally with copolymers of various olefins, methacrylate, styrene, methylvinylether, vinylpyrrolidone, alkenes with quaternary ammonium groups such as vinyl alkyl trimethylammonium, vinyl N-alkyl pyridinium, and vinyl N-alkylmorpholinium, etc. Sulfonate groups can be included using sulfonated styrene or other sulfonated alkenes.

Polysulfonated polymeric dispersants can also be made by sulfonating various alkyl or aryl polymers. Sulfonated napthalene formaldehyde copolymers are also useful. Typically the water soluble polymer or oligomer will have 3 to about 10,000 monomer units, more preferably about 20 to about 2,000 monomer units. Combinations of polymers with complexing agents are often more effective than either agent alone. Thus, mixtures of chelating agents from two or more of the above classes may be desired.

The dissolvable region may comprise at least one odor controlling agent. While many odors are effectively controlled by other ingredients in the composition, such as hypochlorite ion or hypochlorous acid, additional ingredients to control odors may be included. Examples of odor absorbents include, but are not limited to starches, cyclodextrins, activated carbon, zinc ricinoleate, puffed borax, silica, silica gel, fumed silica, precipitated silica, alumina, clay, and zeolites.

The dissolvable region may include a fragrance. Fragrances can be included to improve the odor of the composition, the solution made by dissolving the composition in water, or the article, surface or area that is contacted by this solution. Fragrances may be a single compound such as linalool or a mixture of compounds.

Depending on the nature of the functional agent, the dissolving region may include a flavoring agent. Exemplary flavoring agent may include, but are not limited to, spices, seasonings, sour flavors, flavor enhancers, savory flavors, natural or artificial flavors, isoamyl acetate, benzaldehyde, cinnamic aldehyde, ethyl propionate, methyl anthranilate, allyl hexanoate, ethyl maltol, ethylvanillin, wintergreen oil (methyl salicylate), oil of peppermint, oil of sassafras (synthetic), oil of anise, glutamic acid salts, glycine salts, guanylic acid salts, isosinic acid salts, 5-ribonucleotide salts, acetic acid, ascorbic acid, citric acid, fumaric acid, lactic acid, malic acid, phosphoric acid, tartaric acid, or combinations thereof.

In addition to a flavoring agent, the composition of the dissolving region can include a sweetener. Suitable sweeteners include, but are not limited to, various natural and/or synthetic sweeteners (e.g., sugar alcohols) such as saccharin, sucralose, maltitol, erythritol, cyclamate, glucose, lactose, fructose, stevia, aspartame, sucralose, neotame, acesulfame potassium, dextrose, sucrose, levulose (i.e., fructose), xylitol, maltodextrin, and/or sorbitol.

Colorants may be used to color one or more parts of the shaped composition, or they may be used to color the stream of water resulting after the dissolving portion is dissolved into the stream of water. For example any food coloring—red, green, blue, etc. may be included. Other examples of colorants include inorganic pigments such as cobalt blue, ultramarine blue, permanganate and chromate. Organic dyes and pigments including substituted phthalocyanines, substituted anthraquinones, substituted stilbenes, and substituted indanthrones may be suitable. Some specific examples of suitable colorants include, but are not limited to, Pigment Blue 14, Pigment Blue 15, Pigment Blue 16, Pigment Blue 28, Pigment Green 7, Pigment Green 36, Pigment Yellow 108, Direct Yellow 6, Direct Yellow 28, Direct Yellow 29, Direct Yellow 39, Direct Yellow 96.

The dissolving region, of the shaped composition may include a corrosion inhibitor. The composition may contain precipitated or fumed colloidal silica or a silicate salt with the molar ratio of $SiO_2$ to $Na_2O$ of 1-3 to prevent dulling of metal faucets, sinks, or other appliances. Other examples of suitable corrosion inhibitors include, but are not limited to zinc oxide, zinc phosphate, other phosphate salts, ascorbic acid, cinnamaldehyde, nitrites, dimethylethanolamine, phenylenediamine, hexamine, benzotriazole, benzalkonium chloride, derivatives of tannic acid, morpholine, imidazoline, aliphatic amines, borax, salts of fatty acids, salts of aliphatic or aromatic sulfonic acids, and mixtures thereof.

A viscosity modifier may be included within the dissolving region. Viscosity modifiers can be included to modify the rheology of the treated stream of water. Suitable thickening agents include, for example, natural and synthetic gums or gum like materials such as gum tragacanth, carboxymethylcellulose, polyvinyl pyrrolidone, and/or starch. Linear or branched polycarboxylate polymers are also suitable, especially various high molecular weight polycarboxylates with multiple chains that are linked together as constituents on a multi-functional molecule to create a star-like molecule. Inorganic thickeners including alumina, various clays, organo-modified clays, aluminates and silicates are also suitable thickening agents.

Thickening can also be achieved using combinations of oppositely charged or psuedo-charged surfactants or combinations of surfactants and polymers. Examples include combinations of anionic surfactants such as fatty acids, alkyl sulfates, or alkyl sulfonates with cationic polymers such as DADMAC, polyallyldimethylammonium chloride, combinations of cationic or psuedo cationic surfactants such as alkyl pyridinium salts, alkyltrimethyl ammonium salts, alkyldimethylamine oxides, alkyl betaines, or acylsarcosinates with anionic polymers, anionic surfactants, arylsulfonates, or substituted aryl sulfonates, and surfactants such as alkylether sulfates that thicken by balancing the alkyl chain length with the number of ether linkages.

A vitamin or mineral may be included in the dissolving region. Potable water containing vitamins or minerals prepared by flowing a stream of water over the dissolvable composition may provide a health benefit to the consumer. Exemplary vitamins and minerals include, but are not limited to, Vitamin A, Vitamin B1, Vitamin B2, Vitamin B3, Vitamin B5, Vitamin B6, Vitamin B7, Vitamin B9, Vitamin B12, Vitamin C, Vitamin D, Vitamin E, and mixtures thereof. Precursors that naturally produce vitamins during consumption are also suitable. Examples include, but are not limited to, beta carotene, tryptophan and mixtures thereof. Exemplary minerals include, but are not limited to, salts of potassium, chlorine, sodium, calcium, phosphorous, magnesium, zinc, iron, manganese, copper, iodine, selenium, molybdenum, and mixtures thereof.

A foam booster may be included within the dissolving region. Foam can be created by flowing water over the dissolvable region of the shaped composition. The effect of a foam booster can be enhanced by the inclusion of a surfactant. Certain combinations of surfactants will synergistically increase the amount and longevity of the foam. In addition other ingredients such as water soluble polymers and viscosity modifiers can increase the amount or longevity of the foam. The formulation can also include a foam booster to increase the amount or longevity of foam. Exemplary foam boosters include, but are not limited to, fatty acid amides, alkoxylated fatty acid amides, fatty acid amides of alkanolamines, fatty acid amides of alkoxylated alkanolamines, and fatty acid amides of alkanolamide esters.

The composition may contain a defoamer within the dissolving region. Examples of defoamers or foam control agents include, but are not limited to, alkoxylated alcohols capped with aliphatic ethers, polyglycol ethers, polyglycol esters, polyoxyethylene-polyoxypropylene block coplymers, silica, fumed silica, silicones, aminosilicones, silicone blends, and/or silicone/hydrocarbon blends and mixtures thereof.

A variety of other functional ingredients can also be included depending on the intended use of the composition. Examples of other functional ingredients include, but are not limited to, stain and soil repellants, fluorescent whitening agents, enzymes, cloud point modifiers, anti-microbial agents, sporulation agents, catalysts or activators for hypochlorite ion or hypochlorous acid, and therapeutic agents.

The compositions optionally contain one or more of the following adjuncts: desiccants, lubricants, glidants, agglomeration aids, binders, corrosion inhibitors, electrolytes, solubilizing agents, stabilizers, solid processing aids, preservatives, free radical inhibitors, UV protection agents, antioxidants, and other polymers. Binders, when used, include, but are not limited to, celluloses, starches, gums, and synthetic polymers. Solid processing aids, when used, include, but are not limited to, flow aids, lubricants, anti-static agents, and glidants. Electrolytes, when used, include calcium, sodium and potassium chloride.

Preservatives, when used, include, but are not limited to, mildewstat or bacteriostat, methyl, ethyl and propyl parabens, phosphates such as trisodium phosphate, short chain organic acids (e.g. acetic, lactic and/or glycolic acids), bisguanidine compounds (e.g. DANTAGARD and/or GLYDANT) and/or short chain alcohols (e.g. ethanol and/or IPA). The mildewstat or bacteriostat includes, but is not limited to, mildewstats (including non-isothiazolone compounds) including KATHON GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, all available from Rohm and Haas Company; BRONOPOL, a 2-bromo-2-nitropropane 1,3 diol, from Boots Company Ltd., PROXEL CRL, a propyl-p-hydroxybenzoate, from ICI PLC; NIPASOL M, an o-phenyl-phenol, Na+ salt, from Nipa Laboratories Ltd., DOWICIDE A, a 1,2-Benzoisothiazolin-3-one, from Dow Chemical Co., NIPACIDES from Clariant, and IRGASAN DP 200, a 2,4,4'-trichloro-2-hydroxydiphenylether, from Ciba-Geigy A.G.

The composition may optionally contain a cross-linked water-swellable polymer. In one embodiment, only the dissolvable region of the composition contains a cross-linked water-swellable polymer. In another embodiment, only the non-dissolvable region of the composition contains across-linked water-swellable polymer. In another embodiment, the dissolvable and non-dissolvable regions of the composition both contain a cross-linked water-swellable polymer. Examples of water-swellable polymers include, but are not limited to, cross-linked polycarboxylate, cross-linked polysulfonate, cross-linked carboxymethylcellulose, cross-linked PVP, cross-linked carboxymethyl cellulose, cellulose, sodium carboxymethylcellulose and mixtures thereof.

Suitably, the molecular weight of the water-swellable polymer may be between about 1,000 to about 10,000 daltons, about 1,000 to about 8,000 daltons, about 1,000 to about 6,000 daltons, about 1,000 to about 5,000 daltons, about 1,000 to about 4,000 daltons, about 1,000 to about 2,000 daltons, about 2,000 to about 10,000 daltons, about 2,000 to about 8,000 daltons, about 2,000 to about 6,000 daltons, about 2,000 to about 5,000 daltons, about 2,000 to about 4,000 daltons, about 3,000 to about 10,000 daltons, about 3,000 to about 8,000 daltons, about 3,000 to about 6,000 daltons, about 3,000 to about 5,000 daltons, about 3,000 to about 4,000 daltons, about 4,000 to about 10,000 daltons, about 4,000 to about 8,000 daltons, about 4,000 to about 6,000 daltons, about 5,000 to about 10,000 daltons, about 5,000 to about 7,500 daltons, and about 7,500 to about 10,000 daltons.

Suitably, the water-swellable polymer is optionally present in an amount ranging from about 0.1% to about 60%, about 0.1% to about 50%, about 0.1% to about 40%, about 0.1% to about 30%, about 0.1% to about 20%, about 0.1% to about 15%, about 0.1% to about 10%, about 5% to about 60%, about 5% to about 50%, about 5% to about 40%, about 5% to about 30%, about 5% to about 20%, about 5% to about 10%, about 10% to about 60%, about 10% to about 50%, about 10% to about 40%, about 10% to about 30%, about 10% to about 20%, about 20% to about 60%, about 20% to about 50%, about 20% to about 40%, about 20% to about 30%, about 30% to about 60%, about 30% to about 50%, about 30% to about 40%, and about 40% to about 60%.

As explained above, the provided concentration of functional agent is preferably substantially uniformly delivered over the life of the shaped composition. In one embodiment, any variability within the delivered concentration over the life of the shaped composition is not more than ± about 50%, more preferably no more than ± about 30%, and most preferably no more than ± about 20%. In one embodiment, the life of the shaped composition may refer to the time period between when 90% of the initial mass of the dissolvable region of the shaped composition remains and when 10% of the initial mass of the dissolvable region of the shaped composition remains. For example, there may be a greater variability during a "start up" period when the mass is reduced from 100% to 90%. Similarly, once only 10% of the dissolvable region remains, there may also be a greater variability, and the shaped composition may typically be replaced once reaching 10% of the initial mass of the dissolvable region (e.g., the indicator feature of FIG. 3A or 3B may indicate a need to replace the shaped composition).

Calcium hypochlorite, magnesium hypochlorite, and mixtures thereof are particularly preferred as anti-microbial food-safe sanitizing agents. For example, calcium hypochlorite is relatively inexpensive, provides a highly concentrated source of hypochlorite, and does not exhibit a strong "bleach" type odor upon dissolution into the stream of water at typically effective concentrations. In one embodiment, the concentration of hypochlorite dissolved within the stream of water is typically between about 25 ppm and about 200 ppm, more typically between about 25 ppm and about 100 ppm, and most typically between about 25 ppm and about 75 ppm (e.g., about 50 ppm).

In one embodiment, the minimum concentration of hypochlorite delivered at any time during the life of the shaped composition is at least about 50 ppm, which has been found to be very effective as an antimicrobial sanitizing agent. Contact with the antimicrobial sanitizing agent followed by a period of time for the agent to act is all that may be required for effective sanitation. For example, according to one contemplated method, it may not be necessary for the object to be sanitized (e.g., fruits, vegetables, hands, dishes, other hard surfaces, etc.) to remain within the flow of functionalized water for long. Simple contact with the functionalized water, followed by the passage of a sufficient amount of time may be all that is required. For example, the object may be rinsed, and then set aside. The time period after rinsing may be relatively short, e.g., between about 10 seconds and about 1 minute.

In one embodiment, the sanitizing rinse may be non-invasive and gentle. For example, all that may be required is contact (e.g., no scrubbing required) with the sanitizing rinse and a period of time for the sanitizing agent to work. For example, the concentration of hypochlorite or other sanitizing agent may be sufficient (e.g., at about 50 ppm) so that contacting produce, hands, hard surfaces, or other surfaces with the water stream and then waiting a short period of time (e.g., less than about 1 minute, less than about 30 seconds, about 15 seconds, or about 10 seconds) is sufficient to sanitize the contacted surface. It may not be necessary to rinse the desired object for 10 seconds or more, but simply to contact the object with the sanitizing rinse, and then allow it to sit for at least about 10 seconds to be sanitized. Such embodiments are greatly advantageous over dunking methods, in which submerged dunking contact of 20 minutes or more may be required.

In one embodiment, the geometry of the shaped composition including its overall shape (e.g., a cylinder), the aspect ratio of the provided shape (e.g., greater than about 1, preferably at least about 2, more preferably at least about 3, more preferably at least about 4, and more preferably at least about 5), and the inclusion of the substantially non-dissolvable region all serve as means for providing uniform dissolution of the dissolvable region or layer in a stream of water. In one embodiment, particularly where the aspect ratio is relatively high, (e.g., at least about 3), no non-dissolvable region may be present.

In one embodiment, the shaped composition, including both dissolvable region 102 and optional non-dissolvable region 104 may comprise a hollow cylinder. The geometry of the shaped composition including its overall shape (e.g., a hollow cylinder), the aspect ratio of the provided shape (e.g., greater than about 0.01, preferably at least about 0.05, more preferably at least about 0.1, more preferably at least about 0.5, more preferably at least about 0.75, more preferably at least about 1), and the inclusion of the substantially non-dissolvable region all serve as means for providing uniform dissolution of the dissolvable region or layer in a stream of water.

Figure 4:
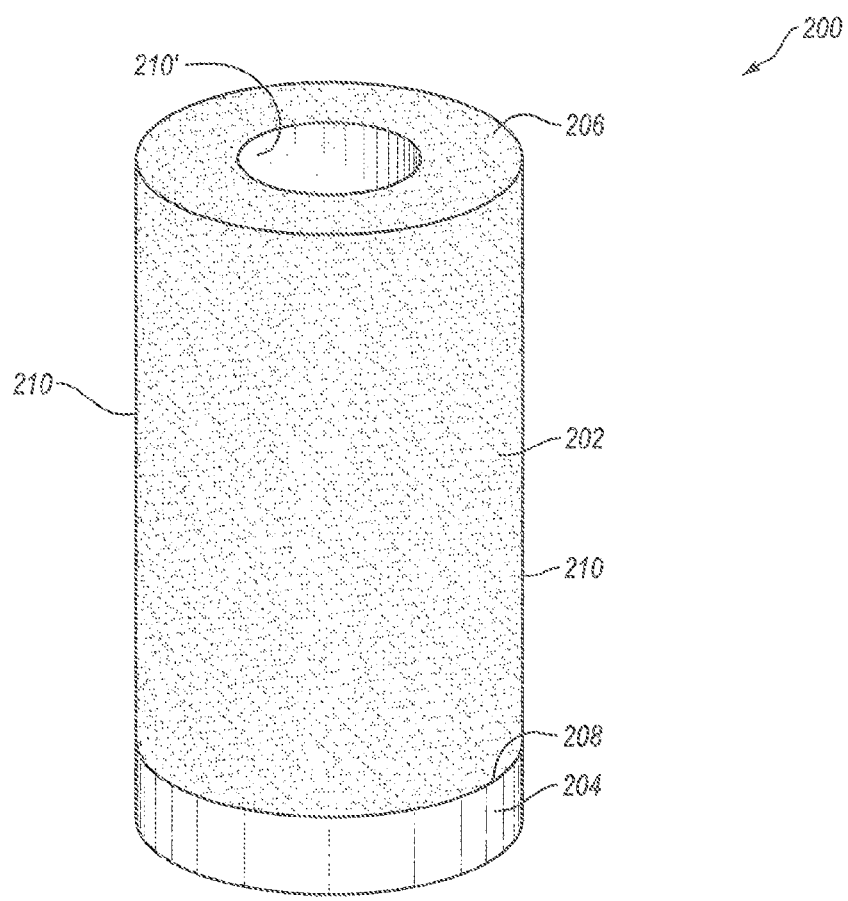
FIG. 4 is a perspective view of an exemplary shaped composition comprising a hollow cylinder.

An exemplary hollow cylinder is shown in FIG. 4. When providing a hollow cylinder 200, dissolution of the dissolvable region 202 may be achieved through diameter reduction, rather than predominantly through height reduction along top surface 206. The stream of water can be contacted with the outer peripheral surface 210, inner peripheral surface 210', or both surfaces 210 and 210'. In the embodiment shown in FIG. 4, a non-dissolvable region 204 may be provided adjacent bottom surface 208.

Where dissolution occurs principally along the peripheral surfaces, substantial uniformity of dissolution may be achieved through geometric considerations. For example, in order that the majority of the exterior surface area of the hollow cylinder 200 is located along the peripheral surface, the hollow cylinder will preferably have an aspect ratio where the height is greater than the diameter. For example, the illustrated configuration of FIG. 4 includes a height that is about 1.5 times the outside diameter.

When dissolving through a mechanism of diameter reduction, one will readily appreciate that the peripheral surface area 210 decreases as the outside diameter is reduced. This changing of the peripheral surface area 210 is offset by providing a hollow cylinder in which dissolution occurs simultaneously along both the outside peripheral surface 210 and the inside peripheral surface 210', because the surface area of the inside periphery 210' increases while that of the outside periphery 210 decreases. Together, the total surface area remains substantially constant.

Figure 14:
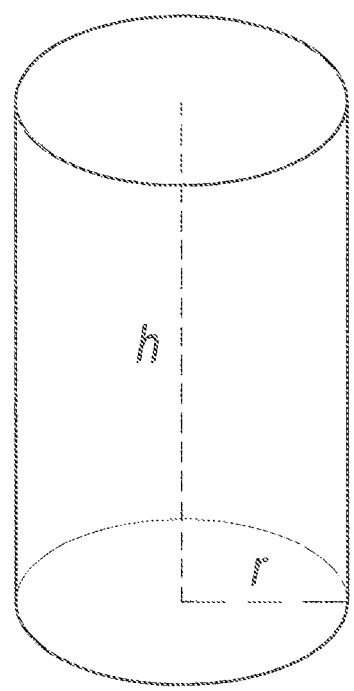
FIG. 14 is a diagram of an exemplary cylinder.

As will be readily apparent, the preference of ratio of the cylinder diameter to height may thus be opposite that of the embodiment shown in FIGS. 2 and 3. In other words, in hollow cylinder embodiments, it may be preferred to provide ratios of height to diameter that are greater than about 1, rather than ratios of diameter to height that are greater than about 1. For a hollow cylinder, the ratio of height to diameter may preferably be at least about 1, at least about 1.5, at least about 2, at least about 3, at least about 4, or at least about 5. Similarly, the ratio of diameter to height may preferably be not greater than about 1, not greater than about 0.67, not greater than about 0.5, not greater than about 0.33, not greater than about 0.25, not greater than about 0.2 as defined in FIG. 14.

Substantially non-dissolvable region 204 may be particularly beneficial where the diameter dimension approaches or is greater than that of the height for similar reasons as explained relative to the cylindrical configuration of FIGS. 2-3. In one embodiment, a non-dissolvable region may be provided to protect and cover the top surface 206, the bottom surface 208, or both. In embodiments where dissolution occurs simultaneously along both outside periphery 210 and inside periphery 210', a non-dissolvable region may not be needed.

Figure 15:
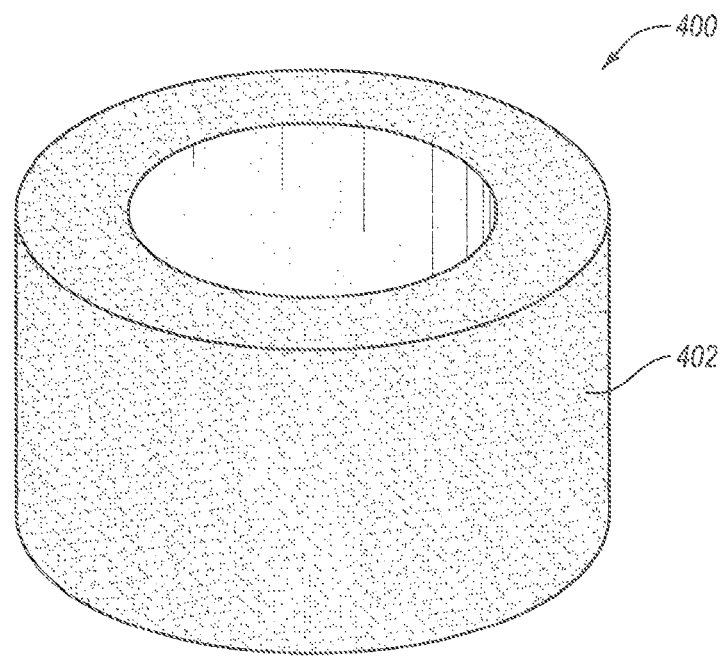
FIG. 15 is a perspective view of a hollow cylinder shaped composition including no non-dissolvable region.
Figure 16:
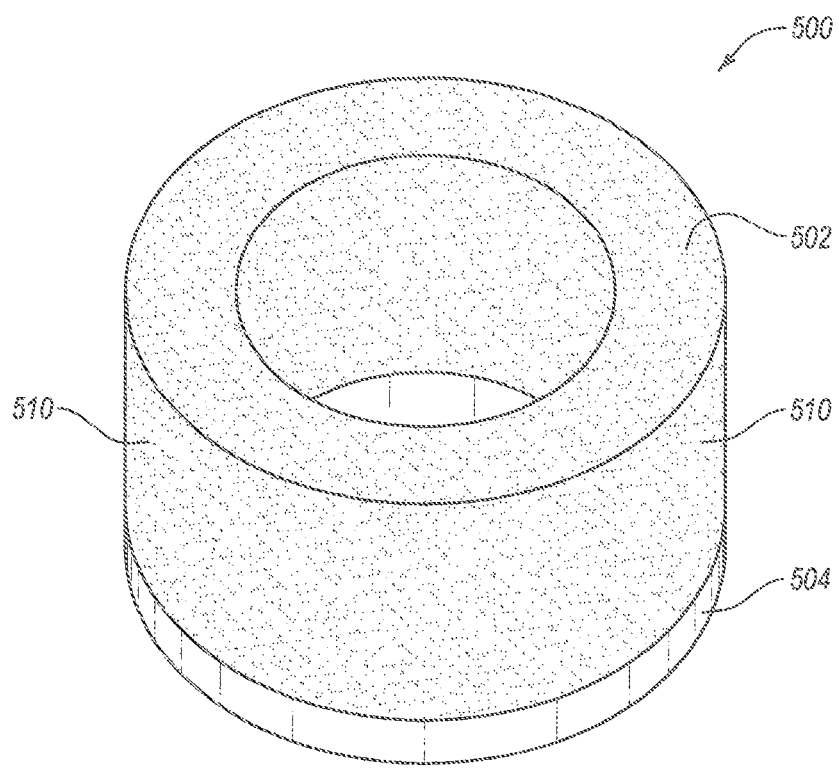
FIG. 16 is a perspective view of a hollow cylinder shaped composition including a non-dissolvable region blocking the bottom of the hollow cylinder.

Additional hollow cylinder configurations are shown in FIGS. 15-18. For example, FIG. 15 shows a hollow cylinder dissolvable composition 400 comprised entirely of a dissolvable region 402, so that no non-dissolvable region is included. FIG. 16 shows a hollow cylinder configuration 500 similar to that shown in FIG. 4, but in which the insoluble layer 504 completely covers the hole of one end of the hollow cylinder 502 so as to prevent water from flowing therethrough. Water is still able to flow along the outside peripheral surface 510 of the hollow cylinder 502, dissolving the dissolvable region 502 through diameter reduction of the outside diameter surface 510.

Figure 17:
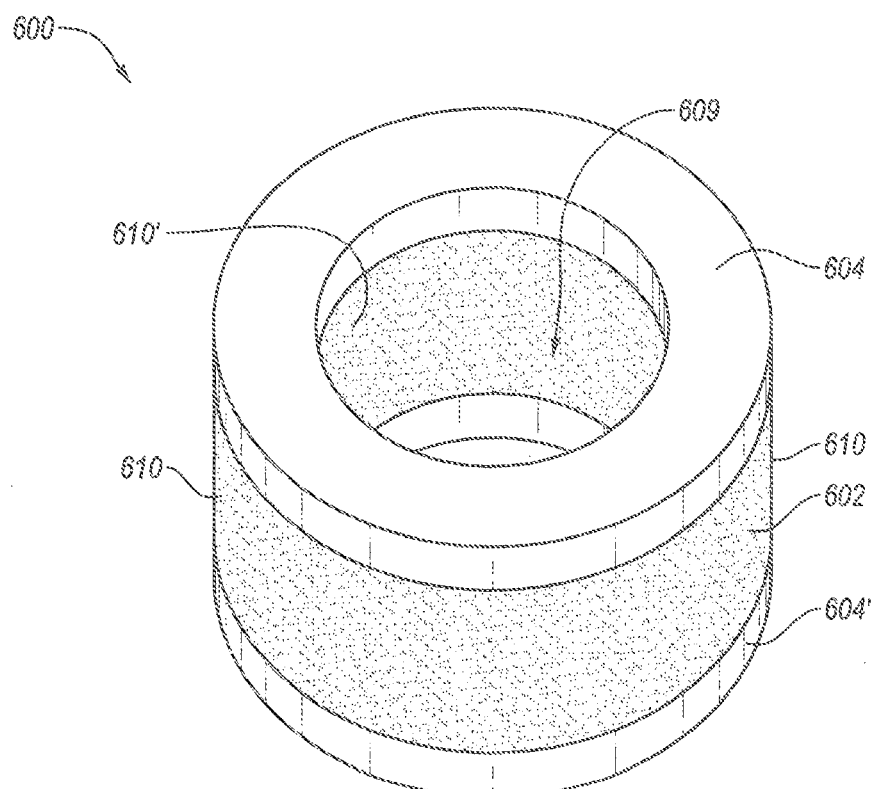
FIG. 17 is a perspective view of a hollow cylinder shaped composition including a dissolvable region sandwiched between two non-dissolvable regions.
Figure 18:
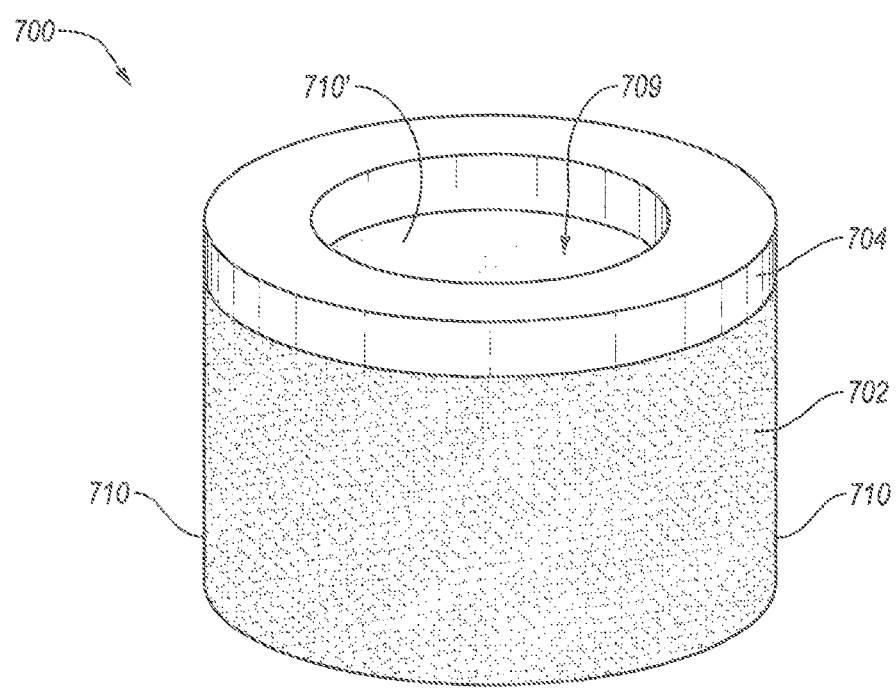
FIG. 18 is a perspective view of a hollow cylinder shaped composition including a non-dissolvable region that covers a top surface of the dissolvable region.

FIG. 17 shows a hollow cylinder 600 with a dissolvable layer 602 in between two insoluble non-dissolvable layers 604 and 604'. The non-dissolvable layers 604 and 604' do not cover either end of the center hole 609 of the cylinder 602 so as to allow water flow along the inside diameter 610', the outside diameter 610, or both. Another embodiment may include a covering of a non-dissolvable region that covers the outside peripheral surface 610 associated with the outside diameter of the hollow cylinder, so that dissolution occurs only along the inside diameter peripheral surface 610'. FIG. 18 shows a hollow cylinder 700 with a dissolvable layer 702 and one non-dissolvable layer 704 covering top surface of the dissolvable layer 702 (i.e., similar to if the hollow cylinder of FIG. 4 were turned upside down). The central hole 709 of the hollow cylinder 700 is not covered or blocked so as to allow water flow along the inside diameter peripheral surface 710'. Of course, water flow is also or alternatively possible along outside diameter peripheral surface 710.

In one embodiment, the functional agent comprises a hypochlorite. The hypochlorite comprises between about 20% and about 100% by weight of the dissolvable region or layer of the shaped composition. In another embodiment, the hypochlorite comprises between about 50% and about 100% by weight of the dissolvable region. In one embodiment, the hypochlorite comprises between about 55% and about 100% of the dissolvable region by weight. In another embodiment, the hypochlorite comprises between about 60% and about 100% by weight of the dissolvable region. In another embodiment, the hypochlorite comprises between about 70% and about 90% by weight of the dissolvable region. In another embodiment, the hypochlorite comprises between about 60% and about 70% by weight of the dissolvable region. In another embodiment, the hypochlorite comprises between about 70% and about 100%, about 80% to about 100%, or about 90% to about 100% of the dissolvable region or layer of the shaped composition.

Additional components may be included within the dissolvable region or layer of the shaped composition, for example, to aid in maintaining uniform delivery of the hypochlorite or other functional agent to the stream of water, to increase or decrease the rate of dissolution of the functional agent, and/or to provide other functional or active agents to the water stream. For example, carbonates (e.g., potassium carbonate), sulfates, sodium chloride and/or polyacryates may be included to adjust the solubility of a hypochlorite functional agent, which increases or decreases the hypochlorite concentration for any given flow rate of the water stream.

Where the hypochlorite comprises calcium hypochlorite, and a carbonate is also included, the inclusion of a polyacrylate may aid in solubilizing calcium carbonate. This can prevent or minimize any precipitation and encrustation of calcium carbonate on the faucet, on the device attachable thereto, or within the sink, etc. Exemplary polyacrylates may include ALCOSPERSE 149D, AQUATREAT AR-978, AQUATREAT AR-980, and ACUSOL 445ND. In one embodiment, the level of polyacrylate provided within the water stream is between about 1 ppm and about 50 ppm, more typically between about 5 ppm and about 30 ppm, most typically between about 10 ppm and about 20 ppm (e.g., about 15 ppm).

Figure 5:
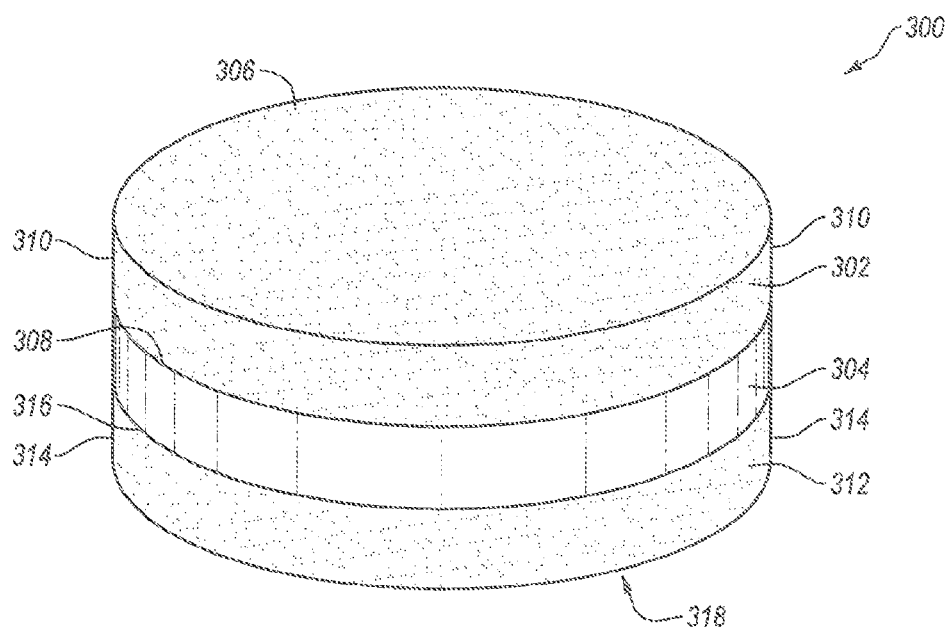
FIG. 5 is a perspective view of an exemplary shaped composition including a third region.

In one embodiment, the shaped composition may further include a third region. An example of such an embodiment is shown in FIG. 5. For example, FIG. 5 shows a shaped composition 300 including a third region 312 that is dissolvable in a manner similar to region 302, but which may contain one or more components that are incompatible with dissolvable region 302. Such a region may be separated from dissolvable region 302 by substantially non-dissolvable region 304. Dissolvable region 302 includes a top surface 306 and peripheral surface 310. Bottom surface 308 is covered by non-dissolvable region 304, which also covers top surface 316 of third region 312. Third region 312 similarly includes an exposed bottom surface 318 and peripheral surface 314. Of course, one may flip the shaped composition over so that third region 312 is disposed at the "top" and dissolvable region 302 is disposed at the bottom.

In one embodiment, such an additional region or layer 312 may include an acid or acid salt for reaction with the hypochlorite so as to form hypochlorous acid. For example, hypochlorous acid is an excellent antimicrobial sanitizing functional agent.

Exemplary acids and salts suitable for use within the second dissolvable region (e.g., third region 312) include, but are not limited to, organic acids, carboxylic acids, dicarboxylic acids, phosphoric acids, phosphonic acids, sulfuric acids, sulfonic acids, saturated fatty acids, unsaturated fatty acids, and inorganic acids. Suitable examples include, but are not limited to, acetic acid, toluene sulfonic acid, xylene sulfonic acid, ocatanoic acid, phosphonic acid (1-hydroxyethylidene) bis-dodecylbenzene sulfonic acid, octenylbutanedioic acid, n-carboxylic acids ($C_6$-$C_{12}$), decanoic acid, ethylenediamine disodium salt, lactic acid, 1,2-ocatanesulfonic acid, 2-sulfino-1-octanesulfonic acid, 2,6-pyridinecarboxylic acid, sulfuric acid, hydrochloric acid, citric acid, sorbic acid, succinic acid, adipic acid, phosphoric acid, phosphoric acid monosodium salt, orthophosphoric acid, pyrophosphoric acid, trimetaphosphoric acid, tripolyphosphoric acid, polyphosphoric acids, tetrapolyphosphoric acid, polyacrylic acid, ascorbic acid, sodium bicarbonate, calcium chloride, humic acid, fumaric acid, lauric acid, palmitic acid, thyristic acid, stearic acid, arachidic acid, behenic acid, lignoceric acid, cerotic acid, myristoleic acid, palmitoleic acid, sapienic acid, oleic acid, linoleic acid, α-linolenic acid, arachidonic acid, eicosapentaenoic acid, erucic acid, docosahexaenoic acid, sodium bisulfate (an acid salt), or mixtures thereof.

Third region 312 may of course include other components described above relative to the other regions. For example, region or layer 312 may include one or more of a builder, a surfactant, a water soluble polymer, an insoluble salt dispersant, a fragrance, or a colorant as described herein. Examples of insoluble salt dispersants include ingredients described in conjunction with the disclosure of builders, water soluble polymers, hydrotropes, cross-linked water swellable polymers, surfactants, fillers, and chelating agents.

In one example, the second dissolvable region includes one or more acids in a sufficient concentration to neutralize any alkaline substances and form hypochlorous acid from the hypochlorite present within the first dissolvable region. In one example, the two dissolvable regions are of approximately equal mass and/or volume (e.g., providing about a 1:1 mixing ratio) and are configured to dissolve at a rate appropriate to the desired ratio.

Other components may be included to adjust the solubility of the dissolvable regions or layers. Suitable solubility adjusting agents include, but are not limited to silica, hydrophobic silica, hydrophobic clay, phosphates, chlorides, polysiloxane compounds, sulfates, calcium sulfate, sodium sulfate, hydroxides, calcium hydroxide, magnesium hydroxide, waxes, resins, cellulose and cellulosic materials (e.g., hydroxypropyl cellulose), polyolefins, polyethylene, oxidized polyethylene, calcium stearate, magnesium stearate, sodium stearate, zinc stearate, fatty acids (e.g., lauric acid, palmitic acid, stearic acid, etc.), silicone, polydimethyl siloxane, dimethicone, cyclodimethicone, hexamethyldisiloxane, magnesium aluminum silicate, sodium magnesium silicate, calcium carbonate, butyl stearate, calcium silicate, dolomite, magnesium carbonate, sodium carbonate, magnesium oxide, magnesium oxide silicate, talc, magnesium sulfate, mineral oil, castor oil, and mixtures thereof. Polyacrylates (e.g., sodium polyacrylate) may be included to increase the rate of dissolution, as well as aiding in dispersion of the functional agent. Typically, each individual solubility adjusting agent preferably comprises no more than about 20% by weight of the dissolving region composition.

In one embodiment, a mixture of adipic and lauric acid is employed in the second dissolvable region. The adipic acid may comprise between about 80% and about 90% of the mixture by weight, while the lauric acid may comprise between about 10% and about 20% of the mixture by weight (e.g., about an 85/15 mixture).

Inclusion of an acid containing layer or region lowers the pH of the resulting water stream. For example, without any such acid, a hypochlorite solution may be very slightly basic (e.g., a pH of about 7.5), while with the addition of the acid, the water stream may be very slightly acidic (e.g., a pH of about 6.5).

Substantially non-dissolvable region or layer 104 may comprise any suitable material that is less soluble than region 102, and preferably does not dissolve to any substantial degree upon exposure to water. Exemplary materials include, but are not limited to, cementitious materials, polymers, inorganic materials, fatty acids or their salts, and mixtures thereof. Exemplary cementitious materials include, but are not limited to, Portland cement, hydraulic cement, hydraulic cement blends, Pozzolan-lime cement, supersulfated cement, calcium aluminate cement, calcium sulfoaluminate cement, geopolymer cement, magnesium oxychloride, magnesium oxysulfate, plaster of Paris, and mixtures thereof. In one embodiment, the non-dissolvable region or layer may be free of cementitious materials (e.g., it may be formed of one or more other classes of non-dissolvable materials).

Exemplary polymer materials include, but are not limited to, waxes (e.g., carnauba wax), resins, natural polymers, phenol resins, polyethylene vinyl acetate, polyolefins, polyamides, polyesters, cellulose, polymers formed from styrene block copolymers precursors, polycaprolactone, fluoropolymers, silicone rubbers, polypyrrole, polyalkylsiloxanes, alkyl polyesters, polyvinyl chloride, urea-formaldehyde resins, polymethyl methacrylate, epoxy adhesives, nylon, polyfluorocarbons, melamine-formaldehyde, polyurethane, polycarbonate, polyimide resins, hydrogels, silicones, polyester, polyethylene, polypropylene, and mixtures thereof. In one embodiment, the non-dissolvable region or layer may be free of polymer materials (e.g., it may be formed of one or more other classes of non-dissolvable materials).

Exemplary inorganic materials include, but are not limited to, hydroxide or oxide compounds of alkaline earth metals, alkaline earth sulfates (e.g., calcium sulfate, magnesium sulfate, and mixtures thereof), alkaline earth phosphates (e.g., calcium phosphate), silicates, borate, aluminate, silica-aluminate, clays, zeolites including hydrates, mono, di and tribasic compounds, fiberglass, and mixtures thereof. Exemplary hydroxides or oxides of alkaline earth metals include, but are not limited to, magnesium oxide, magnesium hydroxide, calcium hydroxide, calcium oxide, and mixtures thereof. Substantially insoluble oxides of other metals may also be used (e.g., zinc oxide). In one embodiment, the non-dissolvable region or layer may be free of inorganic materials (e.g., it may be formed of one or more other classes of non-dissolvable materials).

Exemplary substantially non-dissolvable fatty acid and fatty acid salt materials include, but are not limited to, fatty acids (e.g., stearic acid, palmitic acid, and mixtures thereof), alkaline or alkaline earth fatty acid salts (e.g., salts of stearates or palmitates) such as calcium stearate, magnesium stearate, sodium stearate, and mixtures thereof. Fatty acids (e.g., stearic acid, palmitic acid or other fatty acids) or their salts may include a carbon content of up to about 50 carbon atoms. Such fatty acids may be present within the dissolvable layer (e.g., lauric acid included in Example 29 below).

Where such is the case, the material of the non-dissolvable layer will be substantially less soluble in the stream of water than the fatty acid included within the dissolvable region. In other words, while the substantially non-dissolvable region or layer may be somewhat soluble in water, the dissolvable region or layer will have a substantially greater solubility in water so as to dissolve, leaving the non-dissolvable region or layer substantially intact at the end of the useful life of the shaped composition. In one embodiment, the non-dissolvable region or layer may be free of fatty acid or fatty acid salt materials (e.g., it may be formed of one or more of other classes of non-dissolvable materials).

Many of the materials described above for use as solubility adjusting agents within the dissolvable region or layer may also be suitable for use within the substantially non-dissolvable region or layer. Similarly, many of the substantially non-dissolvable materials described immediately above may be suitable for use as solubility adjusting agents.

In one embodiment, the dissolvable region(s) comprise the majority of the shaped composition. For example, the dissolvable region or regions (e.g., where an acid containing layer or region is provided) may comprise about 55% to about 99% of the shaped composition by weight and/or volume. The non-dissolvable region may comprise a relatively thin layer that covers and protects the bottom surface 108 of dissolvable region 102. Where an acid containing region is also provided, the non-dissolvable region may advantageously be sandwiched between the dissolvable regions so that the bottom surface of one dissolvable region and the top surface of the other dissolvable region are covered and protected by the non-dissolvable region or layer. Such an embodiment may allow the stream of water to contact the top surface and flow over the peripheral surface of the dissolvable layer or region, and then contact the bottom surface of the second dissolvable layer or region.

The various layers or regions of the shaped composition may be attached to one another by any suitable mechanism. For example, attachment may be by mechanical means (e.g., the non-dissolvable region or layer may mechanically interlock with the dissolvable layer), by an adhesive (e.g., any type of glue, including a hot melt thermoplastic adhesive), or any other suitable attachment mechanism. Various suitable mechanisms will be apparent to one of skill in the art in light of the present disclosure.

In one embodiment, the shaped composition is relatively simple, and may function to produce an antimicrobial sanitizing rinse that is food safe by simply contacting the top surface of the dissolvable region with a stream of flowing water (e.g., from a kitchen, bathroom, or laundry faucet). The shaped composition may be retained within a faucet-attachable device configured to easily attach over the dispensing end of a faucet and deliver water from the faucet so as to contact the shaped composition. In one embodiment, the faucet attachable device may include a hinge or other mechanism to allow a portion of the device retaining the shaped composition to be easily moved or rotated out of the path of the stream of water when normal tap water without the functional agent is desired.

Figure 19:
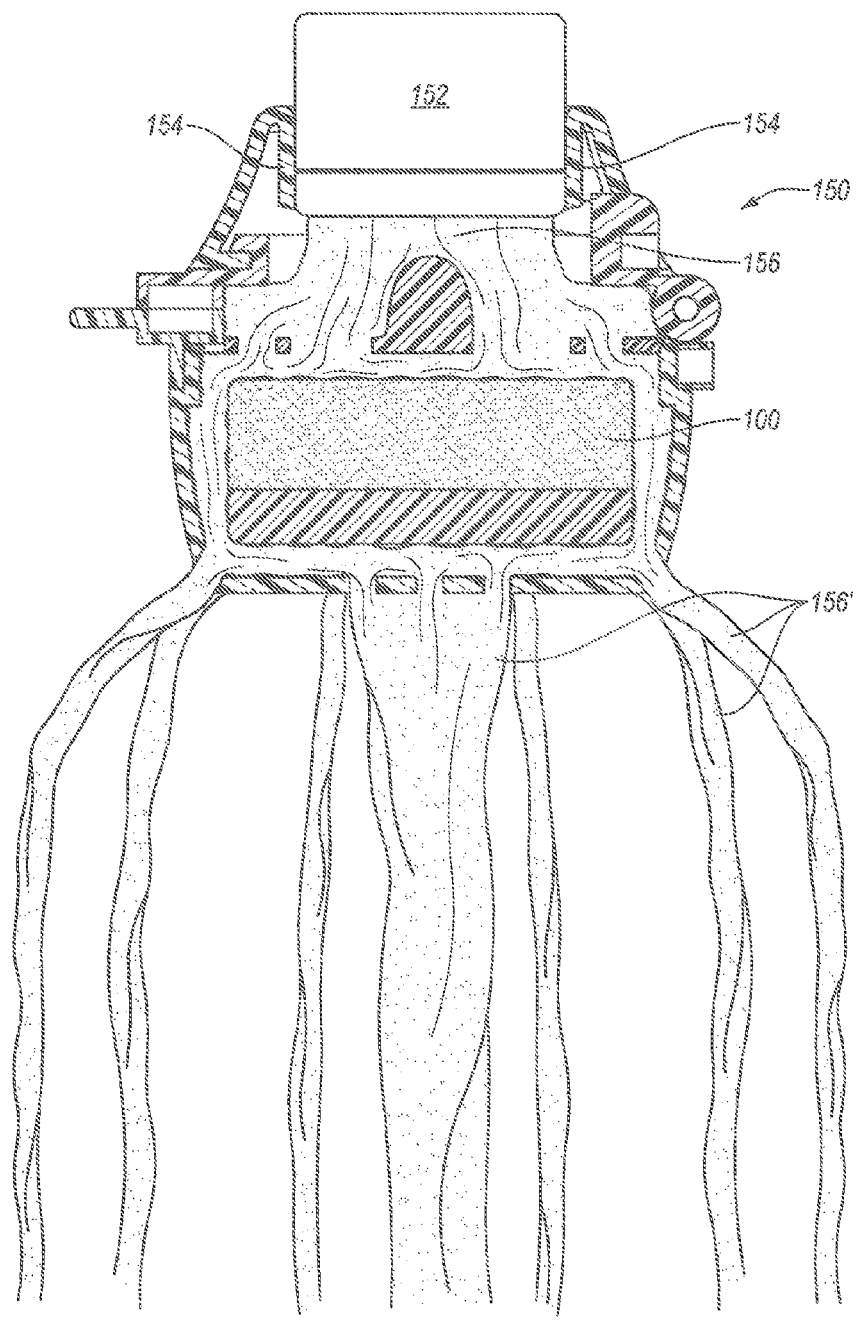
FIG. 19 is a cross-sectional view of an exemplary shaped composition retained within a faucet mountable housing showing a stream of water contacting the top surface of the shaped composition and providing a stream of water with a functional agent dissolved or otherwise introduced therein.

For example, FIG. 19 shows a cross-sectional view of an exemplary faucet mountable device 150 attached over the water delivery end of a faucet 152. Faucet mountable device 150 may be coupled to faucet 152 by any suitable mechanism. In one embodiment, the attachment is through a pressure fitting elastomeric hub including an elastomeric annular inner wall 154, which features are described in further detail in U.S. patent application Ser. No. 13/427,675, filed Mar. 22, 2012, and which is incorporated by reference in its *entirety*.

Shaped composition 100 is retained within faucet mountable device 150 and may be supported to remain off the bottom "floor" surface of device 150 and spaced apart from the side walls of the device 150 by appropriate spacers (not shown). This may allow the water to flow over the top surface and in contact with the peripheral surface of the shaped composition 100 before exiting device 150 as shown. Water 156 provided into device 150 from faucet 152 may be tap water, typically not including any functional agent. The water 156 is directed through device 150, substantially perpendicular to the orientation of the top surface of shaped composition 100 to contact the top surface of shaped composition 100, flows over peripheral surface of shaped composition, and then flows out appropriately positioned holes of device 150. Water 156' exiting device 150 contains the desired functional agent, having been contacted with shaped composition 100.

The shaped composition is relatively simple, and may include no siphons, valves, floats, feeding systems or even monitoring devices. The uniformity of the concentration of functional agent (e.g., a hypochlorite) is delivered through the geometry of the shaped composition, as well as the components included within the dissolvable region or portion that may aid in adjusting (e.g., lowering) the solubility or rate of dissolution of the functional agent. In one embodiment, the dissolvable layer or region is not effervescent. Of course, the non-dissolvable region is not effervescent as well.

In one embodiment, the shaped composition 100 may be contained within a cage or cartridge that is inserted within the faucet attachable device 150 to prevent the user from having to physically touch the shaped composition during replacement. Additional details of an exemplary faucet attachable device are disclosed in U.S. patent application Ser. No. 13/427,675, filed Mar. 22, 2012, and already incorporated by reference in its entirety.

Figure 20:
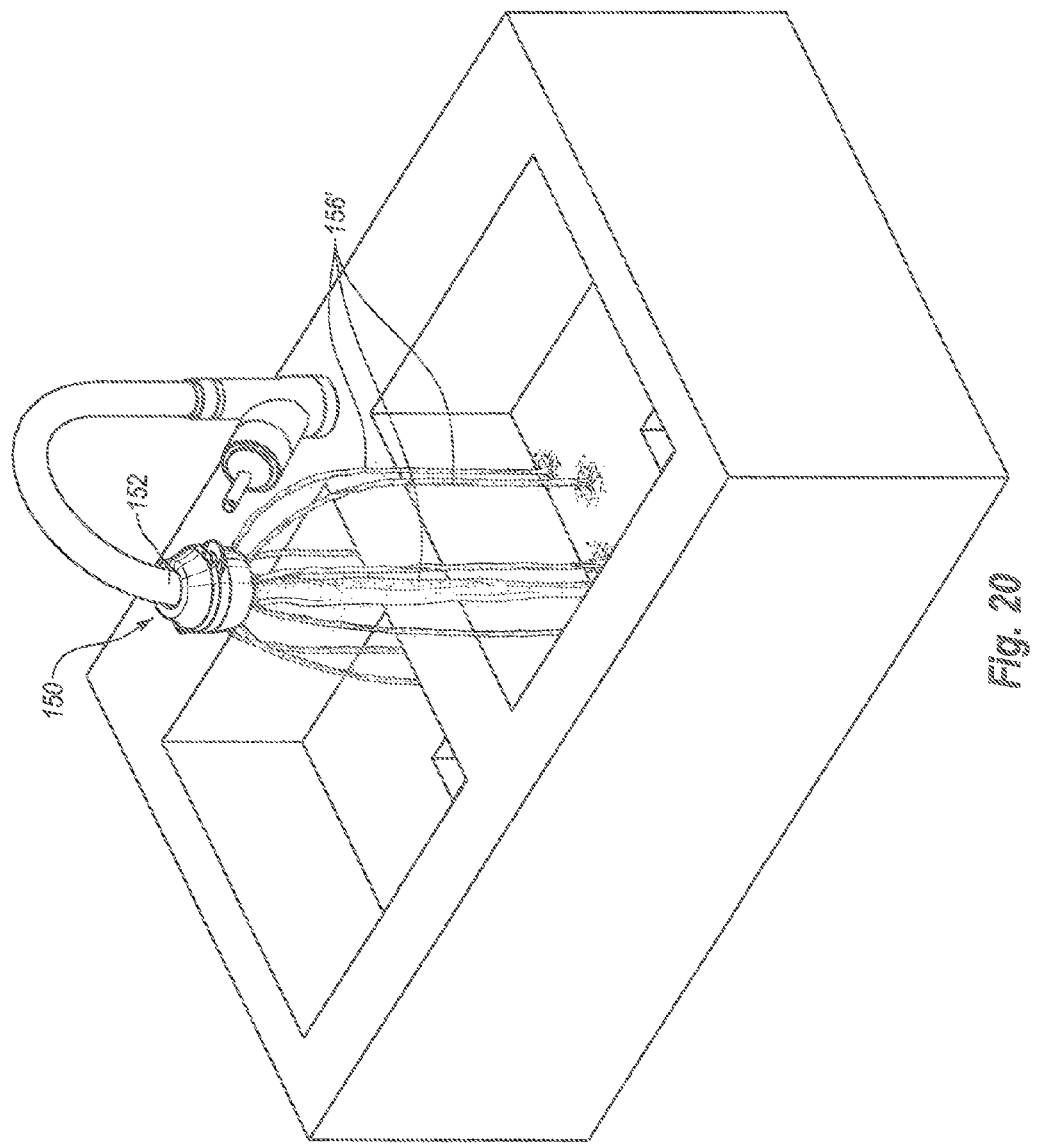
FIG. 20 is a perspective view of the faucet mountable housing shown in FIG. 19 attached to a kitchen faucet over a sink and with the shaped composition retained within the housing "flipped" into the path of the stream of water.

FIGS. 20 and 21 show perspective views of the exemplary faucet mountable device 150 coupled to the delivery end of a kitchen sink faucet. The device 150 may include a hinged or other movable mechanism to allow a portion of the device 150 retaining the shaped composition 100 to be moved (e.g., "flipped") into or out of the flow of the stream of water 156. FIG. 20 shows the configuration of FIG. 19, in which the flowing stream of water has a functional agent introduced therein. FIG. 21 shows an out of flow configuration in which the portion of device 150 including the shaped composition 100 has been rotated or flipped out of the path of the stream of water 156, allowing stream of water 156 to flow without being contacted by shaped composition 100, so that no functional agent is introduced into the flowing stream of water.

Advantageously, the change in configuration may be accomplished easily, without requiring removal of the device 150 from the faucet 152, but simply by rotating or otherwise moving the lower portion of device 150 out of the path of the flow of water 156.

The shaped composition may be sized so as to be replaceable after an appropriate time period. For example, the shaped composition may have a life between about 1 day and about 2 months, between about 2 days and about 1 month, or between about 3 days and about 2 weeks based on an average water flow of about 1.5 gallons per minute, a desired hypochlorite concentration of about 50 ppm, at about 4 uses per day, and about 3 minutes per use. Stated another way, a cylindrical shaped composition having a dissolvable layer volume of about 10 cm³ may be sufficient based on the above usage so that about 8 to 9 tablets would be required each month. Such a 10 cm³ tablet may have a diameter of about 4 cm and a height of about 0.75 cm.

One of skill in the art will appreciate that a wide variety of functional agents may be incorporated within the dissolvable layer or region. For example, various functional agents may include, but are not limited to, an antimicrobial sanitizing agent, a pH adjusting agent, a surfactant, a hydrotrope, a wetting agent, a mineral, a vitamin, a penetrant, a chelating agent, an odor masking agent, an odor absorbing agent, a colorant, a fluorescent whitening agent, a flavoring agent, a fragrance, a sweetener, a potentiator, a sporulation agent, a corrosion inhibitor, a therapeutic agent, a viscosity modifier, a foam stabilizer, a foam booster, a defoamer, a stain and soil repellent, an enzyme, a cloud point modifier, a dispersant, a catalyst, an activating agent, a water softening agent, or mixtures thereof.

EXAMPLES

Figure 6:
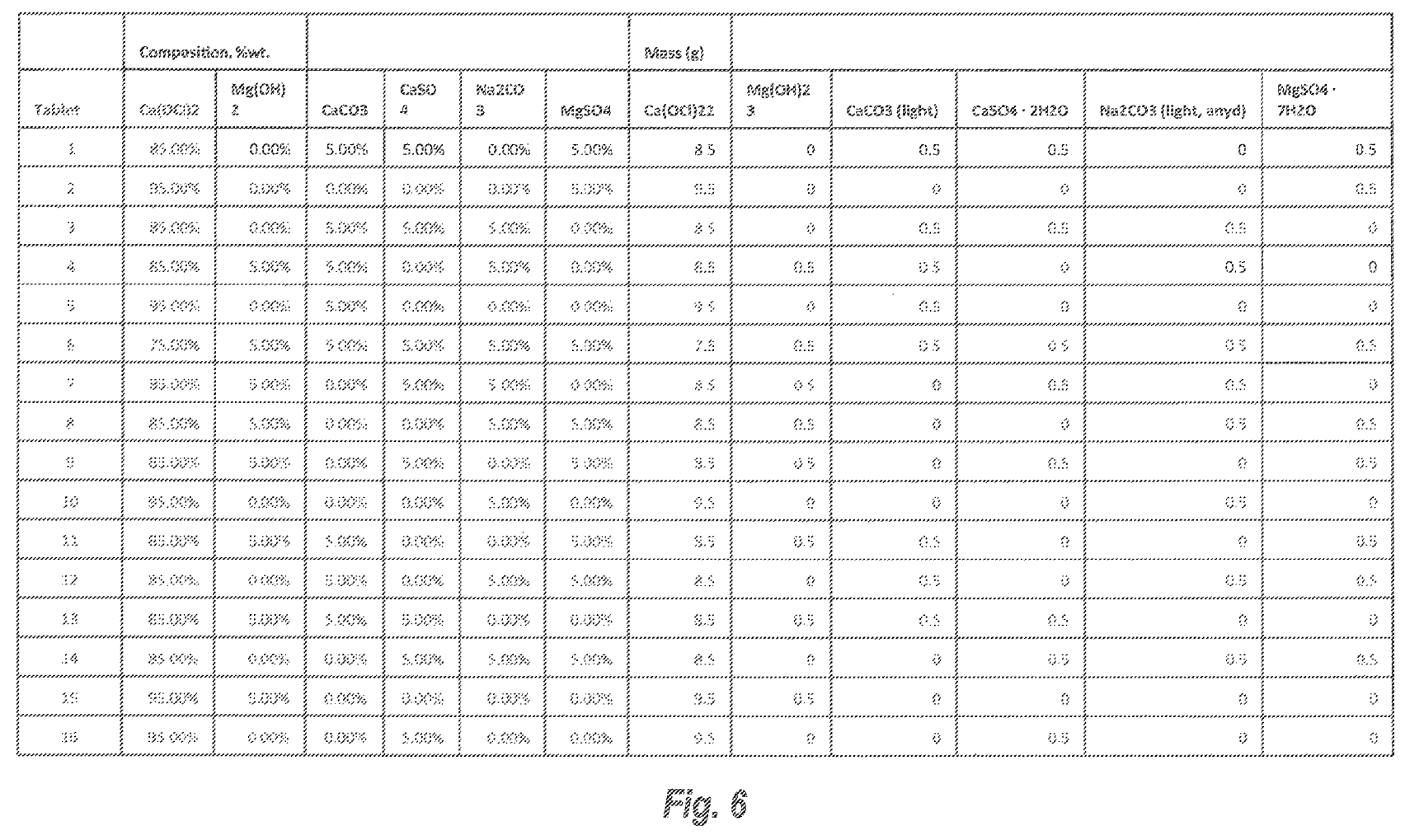
Figure 7:
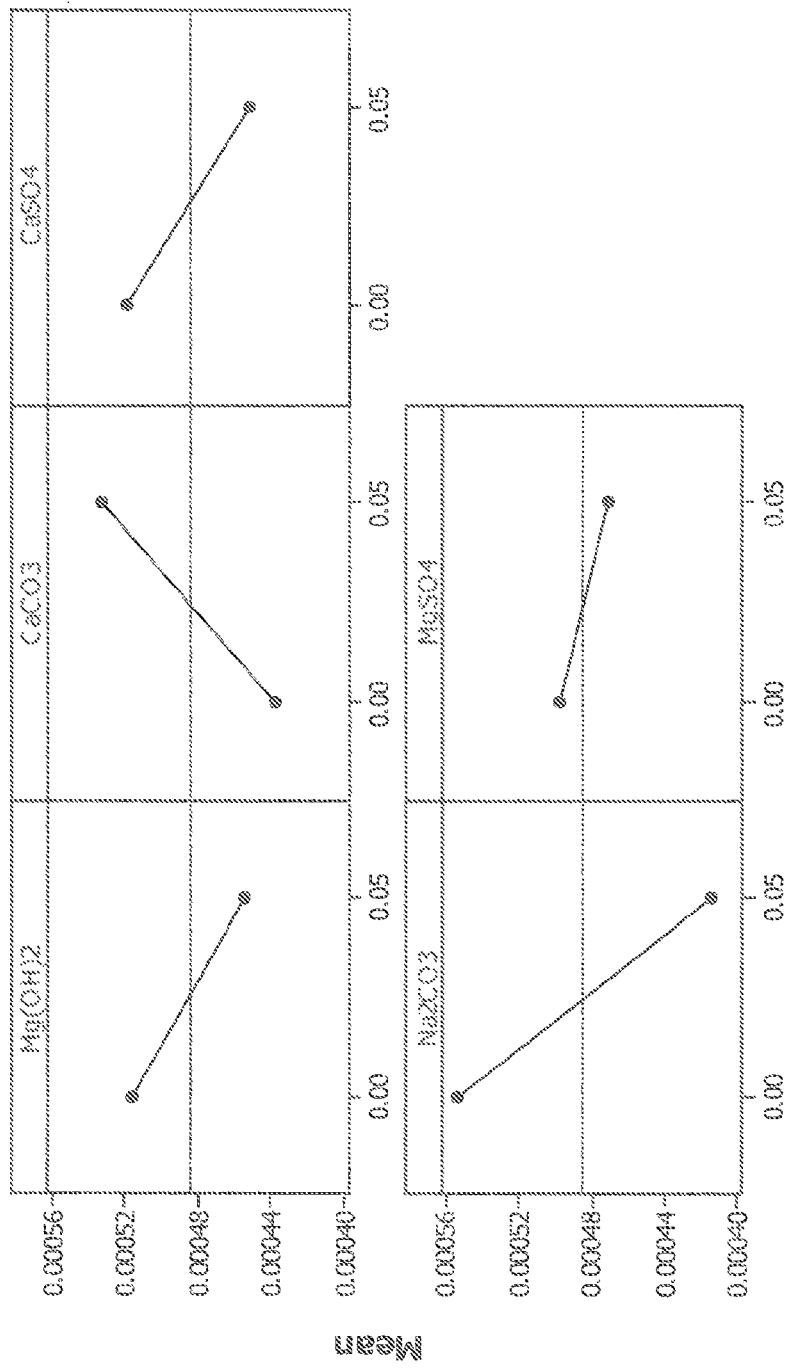
FIG. 7 plots the effects of various adjuvants on dissolution rate of hypochlorite in the dissolving region or layer.
Figure 8:
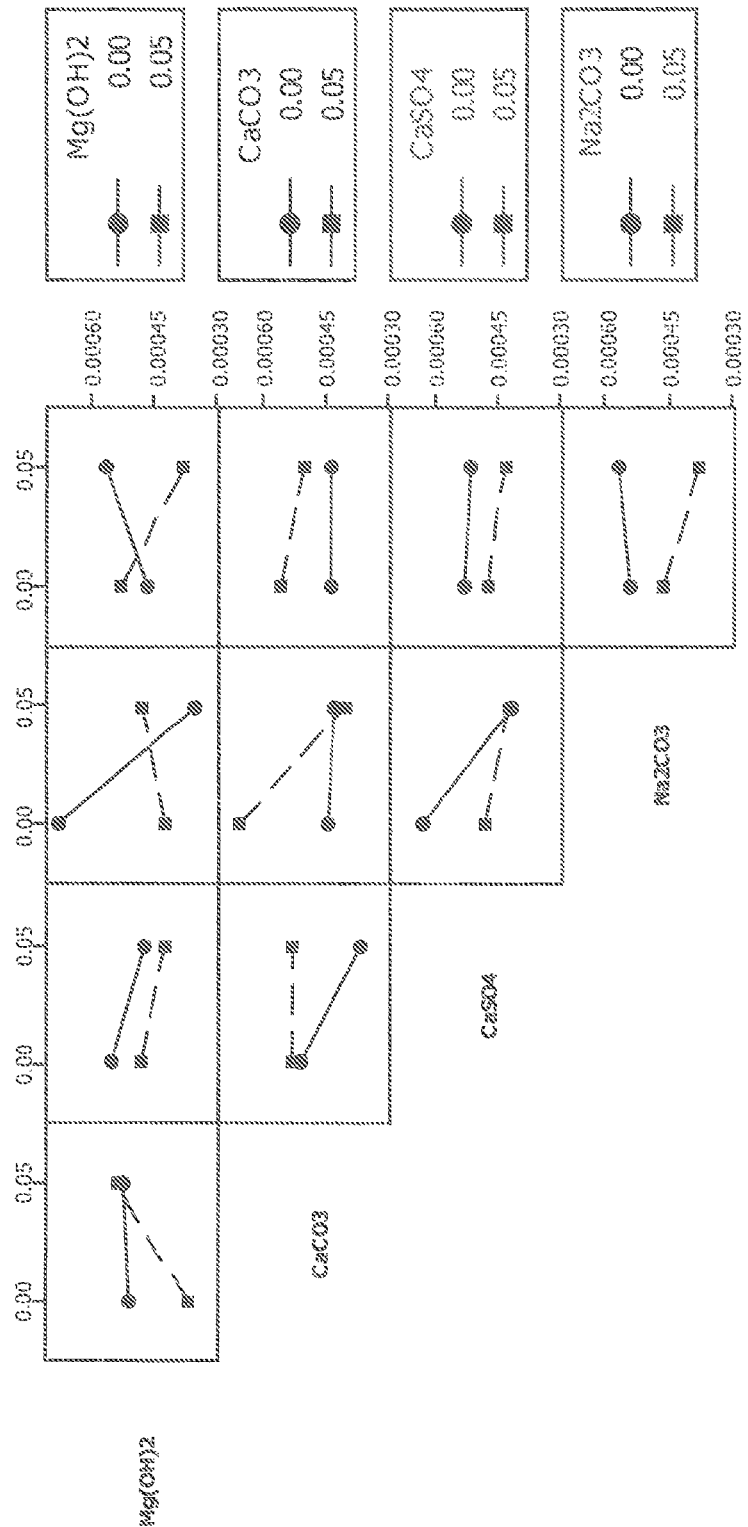
FIG. 8 plots interactions for various the various adjuvants shown in FIG. 7.
Figure 9:
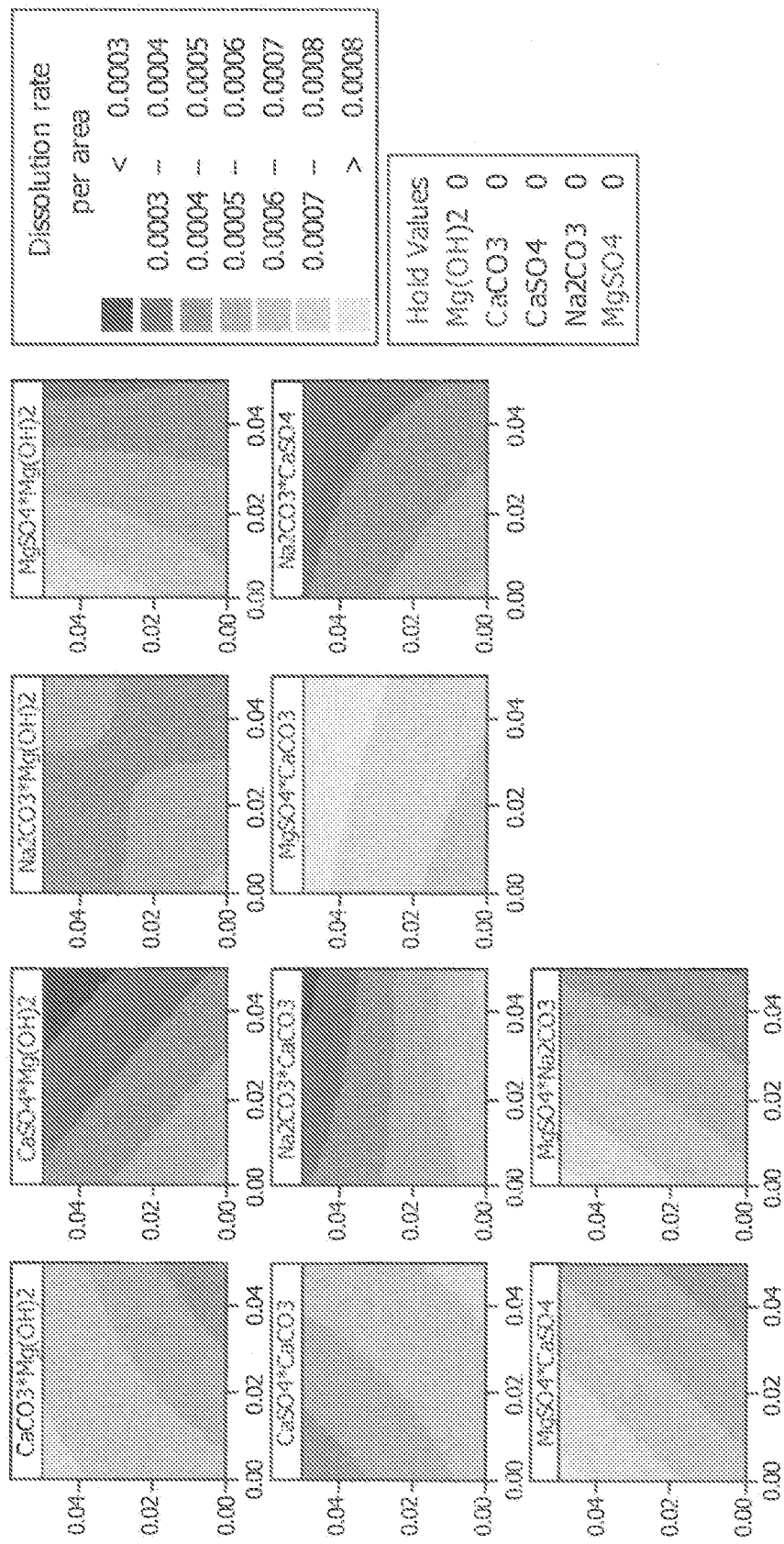
FIG. 9 includes contour plots of dissolution rate per area for the various adjuvants of FIG. 7.

FIG. 6 shows various exemplary tablets 1-16 that were actually made in order to demonstrate the effect of various additives on dissolution rate. The results relative to effect on dissolution are presented in FIGS. 7-9. Each cylindrical tablet had a mass of about 10 g and about 5.5 cm³. Each tablet had a diameter of about 3 cm and a height of about 0.6 cm. The results show that magnesium hydroxide, calcium sulfate, sodium carbonate, and magnesium sulfate act to slow dissolution of the calcium hypochlorite. Such components may be used to tailor the delivered concentration of hypochlorite within the treated stream of water to an effective, desired level (e.g., about 50 ppm).

In contrast, calcium carbonate acts to increase the rate of dissolution of the calcium hypochlorite. The amount of calcium hypochlorite within each example ranged from 75% by weight to 95% by weight, while the various salts were included at 5% by weight, if at all.

The tablets were also provided with differing surface textures, from very rough to smooth including three intermediate textures of rough, textured, and slightly textured in order to study the effect of such texturing. With respect to texturing, it was found that a smooth surface was preferred for providing more uniform dissolution of the dissolvable layer, and that texturing may cause water to pool or otherwise build up on the tablet surface, leading to uneven disintegration of the dissolvable layer of the shaped composition.

Additional examples 1-31 are presented below. Examples 1-14 include a hypochlorite antimicrobial sanitizing functional agent in the dissolvable region or layer.

Example #1

| Dissolvable region | % wt. of dissolvable region |
|---|---|
| calcium hypochlorite | 100% |
| Non-dissolvable region | % wt. of non-dissolvable region |
| magnesium oxide | 100% |

Example #2

| Dissolvable region | % wt. of dissolvable region |
|---|---|
| calcium hypochlorite | 100% |
| Non-dissolvable region | % wt. of non-dissolvable region |
| vermiculite | 100% |

Example #3

| Dissolvable region | % wt. of dissolvable region |
|---|---|
| calcium hypochlorite | 100% |
| Non-dissolvable region | % wt. of non-dissolvable region |
| magnesium silicate | 80% |
| lauric acid | 20% |

Example #4

| Dissolvable region | % wt. of dissolvable region |
|---|---|
| calcium hypochlorite | 100% |
| Non-dissolvable region | % wt. of non-dissolvable region |
| mica | 100% |

Example #5

| Dissolvable region | % wt. of dissolvable region |
|---|---|
| calcium hypochlorite | 100% |
| Non-dissolvable region | % wt. of non-dissolvable region |
| polypropylene mesh | 40% |
| plaster of Paris | 60% |

Example #6

| Dissolvable region | % wt. of dissolvable region |
|---|---|
| calcium hypochlorite | 100% |

| Non-dissolvable region | % wt. of non-dissolvable region |
|---|---|
| magnesium hydroxide | 100% |

Example #7

| Dissolvable region | % wt. of dissolvable region |
|---|---|
| calcium hypochlorite | 100% |

| Non-dissolvable region | % wt. of non-dissolvable region |
|---|---|
| magnesium hydroxide | 90% |
| palmitic acid | 10% |

Example #8

| Dissolvable region | % wt. of dissolvable region |
|---|---|
| calcium hypochlorite | 98% |
| hydrophobic silica | 2% |

| Non-dissolvable region | % wt. of non-dissolvable region |
|---|---|
| magnesium hydroxide | 90% |
| palmitic acid | 10% |

Example #9

| Dissolvable region | % wt. of dissolvable region |
|---|---|
| calcium hypochlorite | 98% |
| magnesium oxide | 2% |

| Non-dissolvable region | % wt. of non-dissolvable region |
|---|---|
| calcium sulfate | 95% |
| dimethicone | 5% |

Example #10

| Dissolvable region | % wt. of dissolvable region |
|---|---|
| calcium hypochlorite | 95% |
| calcium sulfate | 5% |

-continued

| Non-dissolvable region | % wt. of non-dissolvable region |
|---|---|
| magnesium hydroxide | 90% |
| palmitic acid | 10% |

| Third region | % wt. of third region |
|---|---|
| lauric acid | 10% |
| sodium bisulfate | 90% |

Example #11

| Dissolvable region | % wt. of dissolvable region |
|---|---|
| calcium hypochlorite | 71.2% |
| calcium sulfate | 8.5% |
| magnesium hydroxide | 16.9% |
| sodium carbonate | 3.4% |

| Non-dissolvable region | % wt. non-dissolvable region |
|---|---|
| sodium stearate | 100% |

Example #12

| Dissolvable region | % wt. of dissolvable region |
|---|---|
| calcium hypochlorite | 95% |
| calcium stearate | 2% |
| calcium sulfate | 3% |

| Non-dissolvable | % wt. of non-dissolvable region |
|---|---|
| magnesium stearate | 100% |

| Third region | % wt. of third region |
|---|---|
| zinc stearate | 5% |
| sodium bisulfate | 95% |

Example #13

| Dissolvable region | % wt. of dissolvable region |
|---|---|
| calcium hypochlorite | 100% |

| Non-dissolvable region | % wt. of non-dissolvable region |
|---|---|
| magnesium hydroxide | 100% |

| Third region | % wt. of third region |
|---|---|
| adipic acid | 80% |
| lauric acid | 20% |

Example #14

| Dissolvable region | % wt. of dissolvable region |
| --- | --- |
| calcium hypochlorite | 100% |
| Non-dissolvable region | % wt. of non-dissolvable region |
| polypropylene | 100% |

Example 15 includes an exemplary N-halogen compound as an antimicrobial sanitizing functional agent in the dissolvable region or layer.

Example #15

| Dissolvable region | % wt. of dissolvable region |
| --- | --- |
| sodium dichloroisocyanurate | 100% |
| Non-dissolvable region | % wt. o non-dissolvable region |
| silicone | 100% |

Example 16 includes an exemplary quaternary ammonium compound as an antimicrobial sanitizing functional agent in the dissolvable region or layer.

Example #16

| Dissolvable region | % wt. of dissolvable region |
| --- | --- |
| N-alkylbenzyldimethyl ammonium chloride | 80% |
| sodium sulfate | 20% |
| Non-dissolvable region | % wt. of non-dissolvable region |
| palmitic acid | 100% |

Example 17 includes an exemplary peroxide compound as an antimicrobial sanitizing functional agent in the dissolvable region or layer.

Example #17

| Dissolvable region | % wt. of dissolvable region |
| --- | --- |
| sodium percarbonate | 100% |
| Non-dissolvable region | % wt. non-dissolvable region |
| silicone | 100% |

Examples 18-22 include one or more surfactant functional agents in the dissolvable region or layer. Each of these examples includes a large fraction of sodium carbonate (e.g., about 75% to about 90% by weight) within the dissolvable region with the one or more surfactants, and which acts as a builder or carrier, which can increase the effectiveness of the surfactant. The sodium carbonate may also function as a softener and/or a pH adjusting agent in the composition, as well as adjusting the solubility of the surfactant functional agent.

Examples 19, 20, and 22 include 5% sodium polyacrylate within the dissolvable region. Inclusion of the sodium polyacrylate aids in preventing scaling and/or precipitation of carbonate compounds (e.g., calcium carbonate) as a result of ions (e.g., calcium and/or magnesium ions) available within the stream of tap water or elsewhere. The sodium polyacrylate also acts as a dispersant and dissolution aid, speeding up the dissolution of the surfactant functional agent within the dissolvable region.

Example #18

| Dissolvable region | % wt. of dissolvable region |
| --- | --- |
| sodium carbonate | 79% |
| sodium dodecyl sulfate | 21% |
| Non-dissolvable region | % wt. of non-dissolvable region |
| polyethylene vinyl acetate | 100% |

Example #19

| Dissolvable region | % wt. of dissolvable region |
| --- | --- |
| sodium carbonate | 88% |
| sodium carboxymethyl cellulose | 0.3% |
| sodium xylene sulfonate | 3.4% |
| sodium linear alkylbenzene sulfonate | 3.3% |
| sodium polyacrylate(s) | 5% |
| Non-dissolvable region | % wt. of non-dissolvable region |
| polyethylene mesh | 40% |
| polypropylene | 60% |

Example #20

| Dissolvable region | % wt. of dissolvable region |
| --- | --- |
| sodium carbonate | 88% |
| sodium carboymethyl cellulose | 0.3% |
| sodium xylene sulfonate | 3.4% |
| secondary alkane sulfonate, sodium salt | 3.3% |
| sodium polyacrylate(s) | 5% |
| Non-dissolvable region | % wt. of non-dissolvable region |
| calcium sulfate | 95% |
| magnesium oxide | 5% |

Example #21

| Dissolvable region | % wt. of dissolvable region |
|---|---|
| sodium carbonate | 79% |
| sodium dodecyl sulfate | 21% |

| Non-dissolvable region | % wt. of non-dissolvable region |
|---|---|
| zinc oxide | 100% |

Example #22

| Dissolvable region | % wt. of dissolvable region |
|---|---|
| sodium carbonate | 79% |
| hydroxypropyl cellulose | 0.7% |
| decylamine oxide | 12% |
| secondary alkane sulfonate, sodium salt | 3.3% |
| sodium polyacrylate(s) | 5% |

| Non-dissolvable region | % wt. of non-dissolvable region |
|---|---|
| epoxy adhesive | 100% |

Examples 23-28 include an exemplary flavorant functional agent in the dissolvable region or layer. In each of Examples 23-26, the flavorant comprises sodium chloride, providing a salty flavor. Examples 27-28 include sucrose as a flavorant, providing a sweet flavor. Other flavors could alternatively be provided, and will be apparent to one of skill in the art in light of the present disclosure.

Example #23

| Dissolvable region | % wt. of dissolvable region |
|---|---|
| sodium chloride | 100% |

| Non-dissolvable region | % wt. of non-dissolvable region |
|---|---|
| Portland cement | 100% |

Example #24

| Dissolvable region | % wt. of dissolvable region |
|---|---|
| sodium chloride | 100% |

| Non-dissolvable region | % wt. of non-dissolvable region |
|---|---|
| carnauba wax | 100% |

Example #25

| Dissolvable region | % wt. of dissolvable region |
|---|---|
| sodium chloride | 100% |

| Non-dissolvable region | % wt. of non-dissolvable region |
|---|---|
| calcium hydroxide | 100% |

Example #26

| Dissolvable region | % wt. of dissolvable region |
|---|---|
| sodium chloride | 100% |

| Non-dissolvable region | % wt. of non-dissolvable region |
|---|---|
| calcium phosphate | 100% |

Example #27

| Dissolvable region | % wt. of dissolvable region |
|---|---|
| sucrose | 100% |

| Non-dissolvable region | % wt. of non-dissolvable region |
|---|---|
| fiberglass | 40% |
| silicone | 60% |

Example #28

| Dissolvable region | % wt. of dissolvable region |
|---|---|
| sucrose | 100% |

| Non-dissolvable region | % wt. of non-dissolvable region |
|---|---|
| cellulose | 100% |

Example 29 includes a fragrance functional agent in the dissolvable region or layer. Example 29 further includes a large fraction of lauric acid (e.g., about 90% to about 98% by weight) within the dissolvable region with the fragrance, which acts as a builder or carrier for the fragrance, and which can increase the effectiveness of the fragrance. Glycerin is also included as a carrier for the fragrance. For example, a liquid glycerin with fragrance dissolved in it may be deposited on the talk and lauric acid solids to result in the dissolvable region. The lauric acid may also function to adjust the solubility of the fragrance to control the rate of dissolution or entrainment of the fragrance into the stream of water. The lauric acid may also provide anti-oxidant and/or antimicrobial properties (e.g., where the shaped composition is used as an aromatherapy shower wash).

Example #29

| Dissolvable region | % wt. of dissolvable region |
|---|---|
| lauric acid | 96.2% |
| talc | 2.9% |
| glycerin | 0.8% |
| fragrance (citrus) | 0.1% |

| Non-dissolvable region | % wt. of non-dissolvable region |
|---|---|
| polyurethane | 100% |

Examples 30-31 are additional hypochlorite antimicrobial sanitizing functional agent cylindrically shaped composition examples that were formed with and without substantially non-dissolvable layers, and with different diameter to height aspect ratios for the dissolvable layer of the shaped composition in order to demonstrate the effect of the substantially non-dissolvable layer and the aspect ratio on the uniformity of dissolution of the hypochlorite functional agent.

Example #30

| Composition label (description) | Dissolvable layer composition | Non-dissolvable layer composition | Aspect ratio (diameter height$^{-1}$) | Uniform dissolution? |
|---|---|---|---|---|
| 30a (single layer, low aspect ratio) | calcium hypochlorite, 100% wt. | none | 2.07 | no |
| 30b (single layer, high aspect ratio) | calcium hypochlorite, 100% wt. | none | 4.83 | yes |

Example #31

| Composition label (description) | Dissolvable layer composition | Non-dissolvable layer composition | Aspect ratio (diameter height$^{-1}$) | Uniform dissolution? |
|---|---|---|---|---|
| 31a (dual layer, low aspect ratio) | calcium hypochlorite, 100% wt. | polyethylene | 2.04 | yes |
| 3 lb (dual layer high-aspect ratio) | calcium hypochlorite, 100% wt. | polyethylene | 4.83 | yes |

Figure 10:
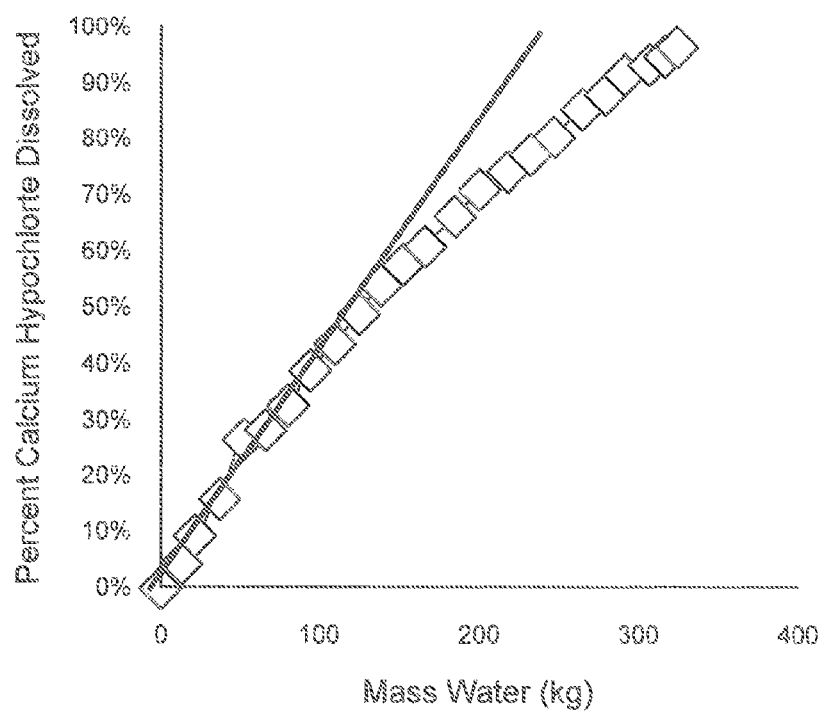
Figure 11:
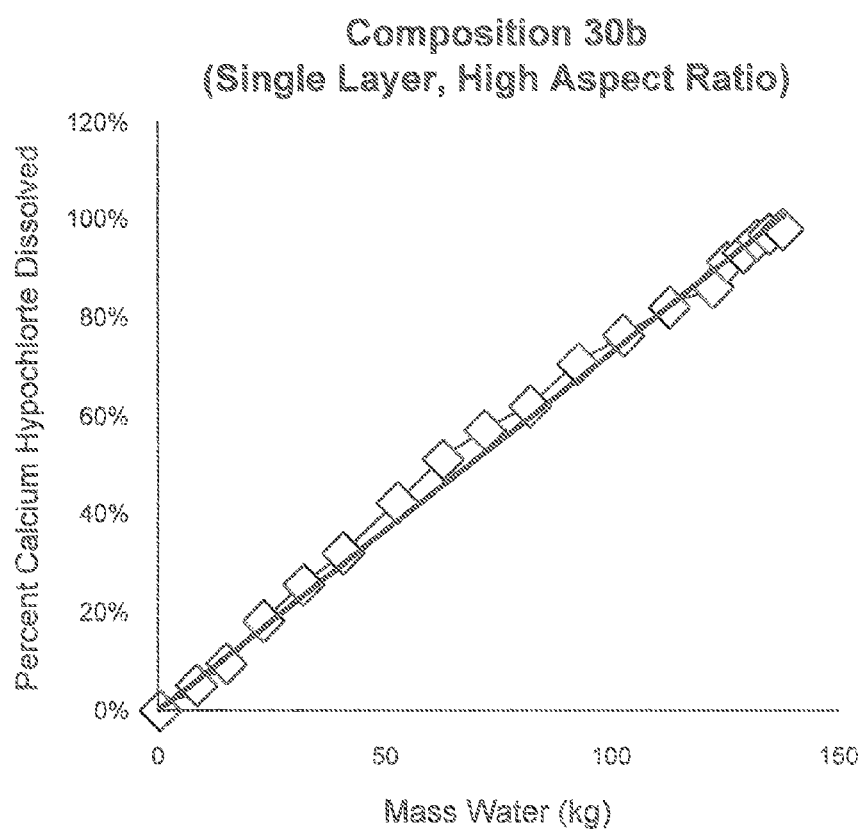
FIG. 11 is a graph showing the dissolution characteristics of composition example 30b.

Dissolution rate data for Examples 30 and 31 are presented in FIGS. 10-13. For example, FIG. 10 shows the dissolution rate data for Example 30a, a calcium hypochlorite dissolvable layer having an aspect ratio of about 2 with no non-dissolvable backing layer. As shown in FIG. 10, the dissolution rate shows undesirable deviation from uniformity, particularly after 50% of the calcium hypochlorite has dissolved. FIG. 11 shows similar data for Example 30b, which is similar to Example 30a but with a higher aspect ratio, of almost 5. At this aspect ratio, even without a non-dissolvable backing layer, the dissolution is substantially uniform over the entire life of the dissolvable layer.

Figure 12:
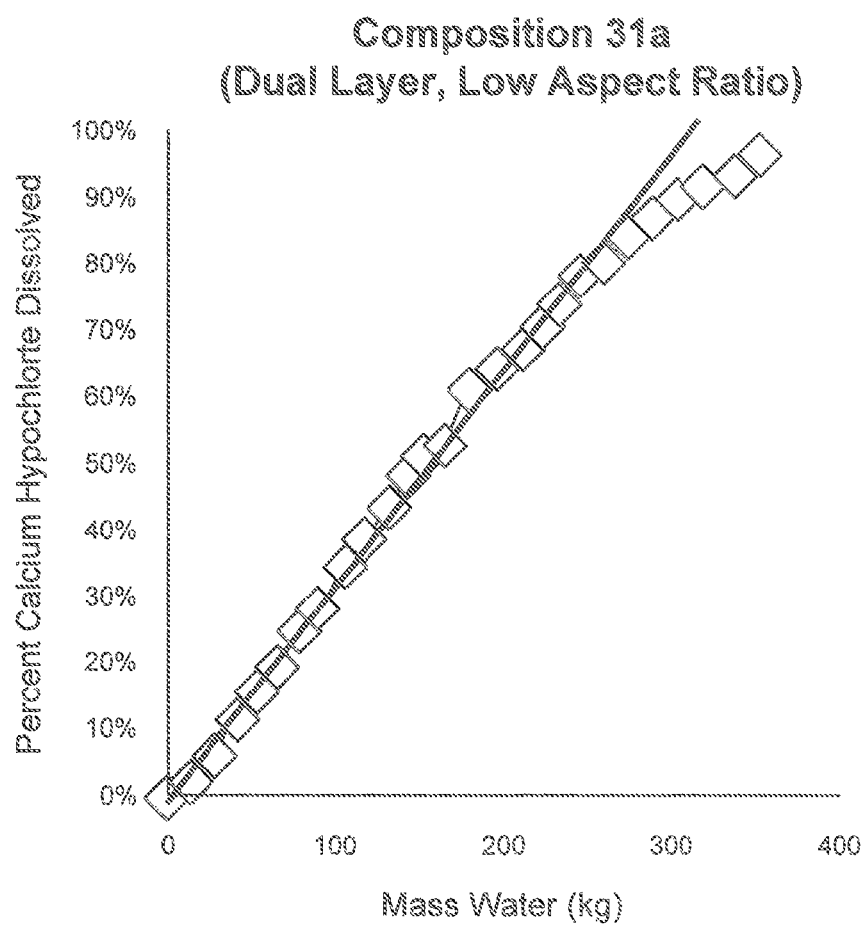
Figure 13:
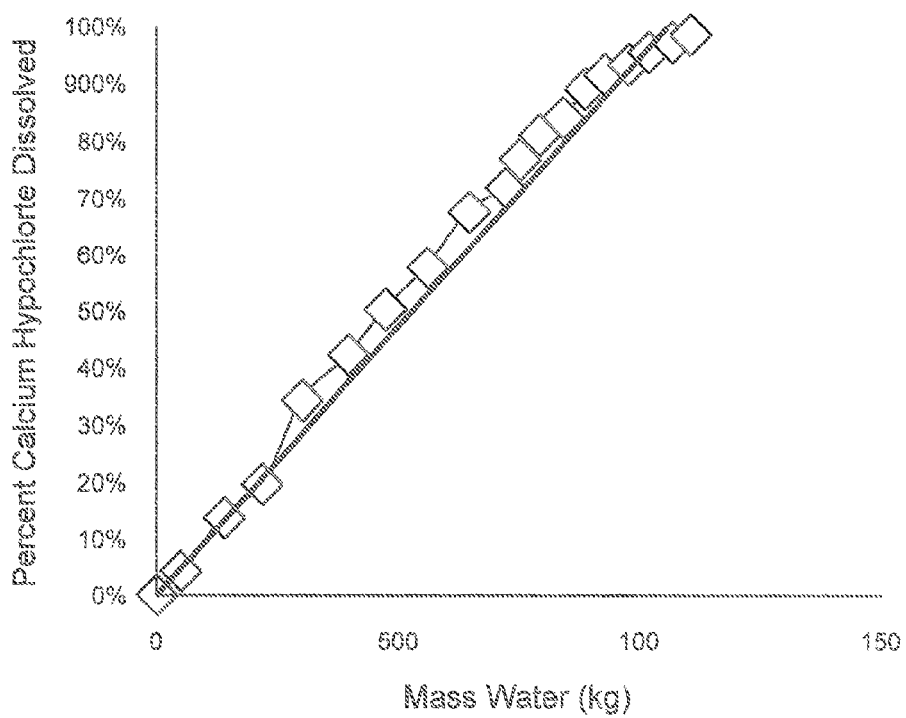
FIG. 13 is a graph showing the dissolution characteristics of composition example 31b.

FIG. 12 shows similar data for Example 31a, which was similar to Example 30a, but which included a non-dissolvable backing layer. The non-dissolvable backing layer significantly improves the uniformity of the dissolution of the dissolvable layer, so as to only show deviation after about 90% of the dissolvable region has been dissolved. FIG. 13 shows similar data for Example 31b, which was similar to Example 30b, but with a non-dissolvable backing layer. Like FIG. 11, this example also showed substantially uniform dissolution over the entire life of the dissolvable layer.

Examples 32-36 are additional hypochlorite antimicrobial sanitizing shaped composition examples. Examples 32-34 include a third region with sodium chloride that may act to adjust the solubility of the hypochlorite functional agent. Example 33 further includes a surfactant in the third region. Example 34 further includes a polyacrylate in the third region. Example 35 includes a third region including a colorant, while Example 36 includes a third region including a fragrance Example #32

| Dissolvable region | % wt. of dissolvable region |
|---|---|
| calcium hypochlorite | 99% |
| calcium stearate | 1% |

| Non-dissolvable region | % wt. of non-dissolvable region |
|---|---|
| magnesium hydroxide | 90% |
| palmitic acid | 10% |

| Third region | % wt. of third region |
|---|---|
| Zeolite A | 10% |
| Sodium chloride | 90% |

Example #33

| Dissolvable region | % wt. of dissolvable region |
|---|---|
| calcium hypochlorite | 99% |
| calcium stearate | 1% |

| Non-dissolvable region | % wt. of non-dissolvable region |
|---|---|
| magnesium hydroxide | 90% |
| palmitic acid | 10% |

| Third region | % wt. of third region |
|---|---|
| Sodium lauryl sulfate | 10% |
| Sodium chloride | 90% |

Example #34

| Dissolvable region | % wt. of dissolvable region |
|---|---|
| calcium hypochlorite | 99% |
| calcium stearate | 1% |

| Non-dissolvable region | % wt. of non-dissolvable region |
|---|---|
| magnesium hydroxide | 90% |
| palmitic acid | 10% |

| Third region | % wt. of third region |
|---|---|
| Sodium polyacrylate | 10% |
| Sodium chloride | 90% |

Example #35

| Dissolvable region | % wt. of dissolvable region |
|---|---|
| calcium hypochlorite | 99% |
| calcium stearate | 1% |

| Non-dissolvable region | % wt. of non-dissolvable region |
|---|---|
| magnesium hydroxide | 90% |
| palmitic acid | 10% |

| Third region | % wt. of third region |
|---|---|
| Sodium sulfate | 95% |
| Calcium stearate | 1% |
| Ultramarine blue | 4% |

Example #36

| Dissolvable region | % wt. of dissolvable region |
|---|---|
| calcium hypochlorite | 99% |
| calcium stearate | 1% |

| Non-dissolvable region | % wt. of non-dissolvable region |
|---|---|
| magnesium hydroxide | 90% |
| palmitic acid | 10% |

| Third region | % wt. of third region |
|---|---|
| Sodium sulfate | 98% |
| Calcium stearate | 1% |
| Fragrance | 1% |

One will appreciate in light of the disclosure herein that the present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for introducing a substantially uniform concentration of an antimicrobial sanitizing functional agent into a flowing stream of water, the method comprising:
   providing a shaped composition comprising: a) a cylindrically shaped dissolvable region including an antimicrobial sanitizing functional agent, the dissolvable region having an exterior surface area including a top surface, a bottom surface, and a peripheral surface: and b) a non-dissolvable region disposed adjacent to the dissolvable region;
   the functional agent being selected from the group consisting of a hypochlorite, a peroxide, a quaternary ammonium compound, a silver salt, an N-halogen compound, an antimicrobial organic acid, and combinations thereof; and
   contacting a flowing stream of water with the top surface of the cylindrically shaped dissolvable region to introduce the functional agent into the flowing stream of water, contact between the flowing stream of water and the top surface of the cylindrically shaped dissolvable region introducing the antimicrobial sanitizing functional agent into the flowing stream of water at a substantially constant concentration over a life of the shaped composition.

2. The method as recited in claim 1, wherein the shaped composition is retained within a faucet mountable device, the faucet mountable device being mounted to a faucet that provides the flowing stream of water.

3. The method as recited in claim 2, wherein the shaped composition is positioned within the flowing stream of water in order to introduce the functional agent into the flowing stream of water, the method further comprising moving a portion of the faucet mountable device that retains the shaped composition out of the flowing stream of water while the faucet mountable device remains mounted to the faucet to allow the stream of water to then flow out the faucet without contacting the shaped composition, so that the flowing stream of water does not include a functional agent introduced therein.

4. The method as recited in claim 1, wherein the functional agent comprises a hypochlorite, the method further comprising:
   positioning an object to be sanitized into the flowing stream of water including the hypochlorite functional agent introduced therein; and
   setting the object aside for a period of time sufficient for the hypochlorite to be effective in sanitizing the object.

5. The method as recited in claim 4, wherein the period of time is less than about 1 minute.

6. The method as recited in claim 4, wherein the period of time is between about 10 seconds and about 1 minute.

7. The method as recited in claim 1, wherein the functional agent comprises a hypochlorite, and an average hypochlorite concentration introduced into the flowing stream of water is maintained between about 25 ppm and about 200 ppm over the life of the shaped composition.

8. The method as recited in claim 1, wherein the functional agent comprises a hypochlorite, and an average hypochlorite concentration introduced into the flowing stream of water is maintained between about 25 ppm and about 100 ppm over the life of the shaped composition.

9. The method as recited in claim 1, wherein the functional agent comprises a hypochlorite, and an average hypochlorite concentration introduced into the flowing stream of water is maintained between about 25 ppm and about 75 ppm over the life of the shaped composition.

10. The method as recited in claim 1, wherein any variability within a delivered concentration of the functional agent over the life of the shaped composition is not more than ± about 50%.

11. The method as recited in claim 1, wherein any variability within a delivered concentration of the functional agent over the life of the shaped composition is not more than ± about 30%.

12. The method as recited in claim 1, wherein any variability within a delivered concentration of the functional agent over the life of the shaped composition is not more than ± about 20%.

13. The method as recited in claim 1, wherein the functional agent comprises a hypochlorite, and any variability within a delivered concentration of the hypochlorite functional agent over the life of the shaped composition is not more than ± about 20%, and a minimum concentration of the hypochlorite functional agent delivered at any point during the life of the shaped composition is at least about 50 ppm.

14. The method as recited in claim 1, wherein the dissolvable region of the shaped composition comprises a cylinder and a ratio of a diameter to height of the shaped composition is at least 1.

15. The method as recited in claim 1, wherein the dissolvable region of the shaped composition comprises a cylinder and a ratio of a diameter to height of the shaped composition is at least about 2.

16. The method as recited in claim 1, wherein the dissolvable region of the shaped composition comprises a cylinder and a ratio of a diameter to height of the shaped composition is at least about 4.

17. A method for introducing a substantially uniform concentration of an antimicrobial sanitizing hypochlorite functional agent into a flowing stream of water, the method comprising:
providing a shaped composition comprising: a) a cylindrical dissolvable region including a hypochlorite salt selected from the group consisting of calcium hypochlorite, magnesium hypochlorite and mixtures thereof, the cylindrical dissolvable region having an exterior surface area including a top surface, a bottom surface, and a peripheral surface: and b) a non-dissolvable region disposed adjacent to the dissolvable region; and
contacting a flowing stream of water with the top surface of the dissolvable region to introduce the hypochlorite into the flowing stream of water, a concentration of hypochlorite introduced into the flowing stream of water being maintained at a substantially constant concentration between about 25 ppm and about 200 ppm over the life of the shaped composition.

18. The method as recited in claim 17, the method further comprising:
positioning an object to be sanitized into the flowing stream of water including the hypochlorite introduced therein; and
setting the object aside for a period of time sufficient for the hypochlorite to be effective in sanitizing the object.

19. The method as recited in claim 18, wherein the period of time is less than about 1 minute.

20. The method as recited in claim 18, wherein the period of time is between about 10 seconds and about 1 minute.

* * * * *